US009320297B2

(12) United States Patent
Short et al.

(10) Patent No.: US 9,320,297 B2
(45) Date of Patent: Apr. 26, 2016

(54) SPHERIFICATION/REVERSE SPHERIFICATION AUTOMATED AND INTEGRATED SYSTEM AND METHOD

(71) Applicant: Lemniscate Innovations LLC, Miami, FL (US)

(72) Inventors: Michael Philip Short, Cambridge, MA (US); Xavier Rene Gonzalez Barrios, Miami, FL (US); Argelio A. Maldonado, Key Biscayne, FL (US)

(73) Assignee: Lemniscate Innovations LLC, Miami, FL (US)

( * ) Notice: Subject to any disclaimer, the term of this patent is extended or adjusted under 35 U.S.C. 154(b) by 0 days.

(21) Appl. No.: 13/804,350

(22) Filed: Mar. 14, 2013

(65) Prior Publication Data

US 2013/0251862 A1     Sep. 26, 2013

Related U.S. Application Data

(60) Provisional application No. 61/614,496, filed on Mar. 22, 2012.

(51) Int. Cl.
*A23L 1/05*     (2006.01)
*A23P 1/10*     (2006.01)
(Continued)

(52) U.S. Cl.
CPC .............. *A23P 1/10* (2013.01); *A23L 1/0029* (2013.01); *A23L 1/05* (2013.01); *A23L 1/0532* (2013.01);
(Continued)

(58) Field of Classification Search
CPC ....... A23L 1/0029; A23L 1/0032; A23L 1/05; A23L 1/052; A23L 1/056; A23L 1/0562; A23L 1/05625; A23P 1/10; A23P 1/04; A23P 1/045; B29C 47/92
USPC ................................... 425/5, 6, 10
See application file for complete search history.

(56) References Cited

U.S. PATENT DOCUMENTS 5,006,361 A * 4/1991 Cox ............................. 426/601
5,211,980 A * 5/1993 Cox ............................. 426/601
(Continued)

FOREIGN PATENT DOCUMENTS

EP       0090600 A2    10/1983
ES       EP2537420 A1  12/2012
WO       2014159678 A3 10/2014

OTHER PUBLICATIONS

W. Wayt Gibbs and Nathan Myhrvold, "Spherical Eats, The Chemistry of Encased Mussels and Other Edible Orbs," Scientific American, Oct. 2011, p. 28.
(Continued)

*Primary Examiner* — Seyed Masoud Malekzadeh
(74) *Attorney, Agent, or Firm* — Lewis Rice LLC

(57) ABSTRACT

An apparatus for producing gelled pearls includes: a housing with at least one opening into which a flavored liquid is provided; external components; and internal components. The external components include: a first ingress port through which a first refill pack is coupled; and a dispenser with tubing through which a processed solution is expelled into a gelling bath. The internal components include: a mixing tank for blending the flavored liquid with the first solution; a first flow valve fluidly coupled with the mixing tank and directing the flavored liquid into and out of the mixing tank; a second flow valve fluidly coupled with the mixing tank and directing flow of a proportional amount of the first solution into the mixing tank; and a microcontroller device.

17 Claims, 26 Drawing Sheets

(51) Int. Cl.

| | | |
|---|---|---|
| *A23L 1/0532* | (2006.01) | |
| *A23P 1/04* | (2006.01) | |
| *A23L 1/0562* | (2006.01) | |
| *A23L 1/00* | (2006.01) | |
| *B29C 47/92* | (2006.01) | |

(52) U.S. Cl.
CPC ................ *A23P 1/04* (2013.01); *A23L 1/0032* (2013.01); *A23L 1/0562* (2013.01); *A23L 1/05625* (2013.01); *A23P 1/045* (2013.01); *B29C 47/92* (2013.01)

(56) References Cited

U.S. PATENT DOCUMENTS

| | | | | |
|---|---|---|---|---|
| 5,268,189 | A | | 12/1993 | Doerter |
| 5,417,153 | A | * | 5/1995 | King et al. ...................... 99/517 |
| 5,441,702 | A | | 8/1995 | Lemieux et al. |
| 5,520,942 | A | * | 5/1996 | Sauer et al. ................... 426/289 |
| 5,525,367 | A | * | 6/1996 | King et al. .................... 426/533 |
| 5,577,668 | A | * | 11/1996 | King et al. .................... 239/559 |
| 5,578,337 | A | * | 11/1996 | Thota et al. ................... 426/573 |
| 5,932,270 | A | * | 8/1999 | Rock et al. .................... 426/572 |
| 6,113,968 | A | * | 9/2000 | McGuire et al. ............... 426/577 |
| 6,251,466 | B1 | * | 6/2001 | McGuire et al. ............... 426/577 |
| 6,688,214 | B1 | * | 2/2004 | Kikuchi et al. ................. 99/483 |
| 2002/0062123 | A1 | | 5/2002 | McClurken et al. |
| 2002/0110624 | A1 | | 8/2002 | Roth |
| 2002/0172750 | A1 | * | 11/2002 | Nelles et al. ................... 426/582 |
| 2003/0085237 | A1 | | 5/2003 | Kateman et al. |
| 2003/0207015 | A1 | * | 11/2003 | Jindra et al. ................... 426/577 |
| 2004/0062841 | A1 | | 4/2004 | Lowry et al. |
| 2004/0096546 | A1 | * | 5/2004 | Gillessen ........................ 426/61 |
| 2005/0019374 | A1 | * | 1/2005 | Modliszewski et al. ....... 424/439 |
| 2005/0214413 | A1 | * | 9/2005 | McAnalley et al. ............ 426/74 |
| 2009/0208566 | A1 | | 8/2009 | Vigo et al. |
| 2010/0007501 | A1 | | 1/2010 | Yang et al. |
| 2010/0247712 | A1 | * | 9/2010 | Rudolph ......................... 426/61 |
| 2012/0003366 | A1 | | 1/2012 | Dorendorf et al. ............ 426/285 |
| 2012/0103325 | A1 | * | 5/2012 | Koenig et al. .................. 127/67 |
| 2012/0112374 | A1 | * | 5/2012 | Ohtani et al. .................. 264/9 |
| 2013/0026669 | A1 | * | 1/2013 | Beckett et al. ................. 264/9 |
| 2013/0164400 | A1 | * | 6/2013 | Knopov et al. ................. 425/5 |

OTHER PUBLICATIONS

International Search Report, International Patent Application No. PCT/US2014/024718, mailed Nov. 10, 2014, 65 pages.

* cited by examiner

Dispensing Spout can be hinged up and hidden

Filter for Water Junctions to
Prevent Calcium Contamination

Top View of Mounting Base

Side View of Machine on Mounting Base

1210

Bottom View of Mounting Base
Displaying Traction/Grip Pad

SPHERIFICATION/REVERSE SPHERIFICATION AUTOMATED AND INTEGRATED SYSTEM AND METHOD

CROSS-REFERENCE TO RELATED APPLICATIONS

This application is a non-provisional of, and claims priority to, U.S. Patent Application Ser. No. 61/614,496, filed on Mar. 22, 2012, incorporated by reference as if fully set forth herein.

FIELD OF THE INVENTION

The invention disclosed broadly relates to the field of molecular gastronomy, and more particularly relates to automating the processes of spherification and reverse spherification.

BACKGROUND OF THE INVENTION

Molecular gastronomy, also known as molecular cuisine, is a relatively new entry in the world of avant-garde cuisine. The spherification technique that is the hallmark of molecular gastronomy is thought to have been popularized in 2003 by Ferran Adria, legendary chef of El Bulli restaurant. Chef Adria prepares a variety of edible spheroids using intriguing combinations of flavors. Molecular mixology is a related term that is used for concocting beverages with edible spheroids that at the present time are served exclusively in very high-end establishments. The spheroids or edible pearls are produced by gelling a prepared liquid formed into a sphere. By gelling we describe a process wherein the membrane of the sphere increases in thickness from the outside in.

The appeal of the edible spheroids (edible pearls) is such that consumers, after having experienced the unique gastronomical treats as patrons of innovative restaurants and bars, order manual kits for making the pearls themselves. The kits employ syringes and provide a method to produce the pearls by hand. The downside to the kits is that one is limited in the amount of pearls one can make with the manual, syringe-based kits. The state of the art for spherification kits is that they are very labor intensive and time-consuming, yielding a small number of edible pearls per "batch." In addition, it takes a large amount of time and skill to mix the powders/reagents necessary for the spherification reaction at the precise/correct proportions using these syringe-based kits.

Furthermore, the conventional method of preparation requires lab equipment and ingredients not typically found in a bar or restaurant. The manual preparation method requires a number of cumbersome steps, including the accurate and precise mixing of various powders. Another disadvantage of the existing manual method is that the prepared pearls are of uneven size and thickness, which can lead to a decrease in consumer appeal. The kit's manual method of preparing the pearls requires that the preparer have a certain minimum skill level that requires training.

There is a need for an automated method of making edible pearls that overcomes the above-stated shortcomings of the known art.

SUMMARY OF THE INVENTION

Briefly, according to an embodiment of the invention an apparatus for producing gelled pearls includes: a housing with at least one opening into which a flavored liquid is provided; external components, and internal components. The external components include: a first ingress port through which a first refill pack is coupled; and a dispenser with tubing through which a processed solution is expelled into a gelling bath. The internal components include: a mixing tank for blending the flavored liquid with the first solution; a first flow valve fluidly coupled with the mixing tank and directing the flavored liquid into and out of the mixing tank; a second flow valve fluidly coupled with the mixing tank and directing flow of a proportional amount of the first solution into the mixing tank; and a microcontroller.

The microcontroller is a processor device performing steps of: measuring a volume of the flavored liquid; calculating an amount of the first solution to add to the mixing tank based on the volume of the flavored liquid; activating a dispensing of the calculated amount of the first solution into the mixing tank; activating a mixer for blending the flavored liquid and the first solution for a predetermined amount of time in the mixing tank to form a processed solution; and activating the dispenser to dispense the processed solution as droplets into the gelling bath to gellify the droplets, thus producing the gelled pearls.

According to another embodiment of the present invention, a reverse spherification method of producing gelled pearls includes steps or acts of: providing a flavored liquid into a mixing tank housed in an apparatus; using a microcontroller, performing: measuring a volume of the flavored liquid poured into the mixing tank; calculating an amount of a salt solution to add to the mixing tank based on the volume of the flavored liquid; dispensing the calculated amount of the salt solution into the mixing tank from a first ingress port; mixing the flavored liquid and the salt solution a predetermined amount of time in the mixing tank to form a processed solution; and dispensing the processed solution as droplets into a gelling bath to gellify the droplets, thus producing the gelled pearls.

According to another embodiment of the present invention, a method of producing gelled pearls using a spherification process includes steps or acts of: providing a flavored liquid into a mixing tank housed in an apparatus; using a microcontroller device, performing: measuring a volume of the flavored liquid poured into the mixing tank; calculating an amount of a gelling agent, such as concentrated sodium alginate, to add to the mixing tank based on the volume of the flavored liquid; dispensing the calculated amount of the gelling agent into the mixing tank from a first ingress port; activating a mixer to mix the flavored liquid and the gelling agent a predetermined amount of time in the mixing tank to form a processed solution; and activating a dispenser to dispense the processed solution as droplets into a gelling bath containing a salt solution to gellify the droplets, thus producing the gelled pearls.

BRIEF DESCRIPTION OF THE SEVERAL VIEWS OF THE DRAWINGS

To describe the exemplary purposes, aspects, and advantages of the invention, we use the following detailed description of exemplary embodiments of the invention with reference to the drawings, in which.

Figure 1:
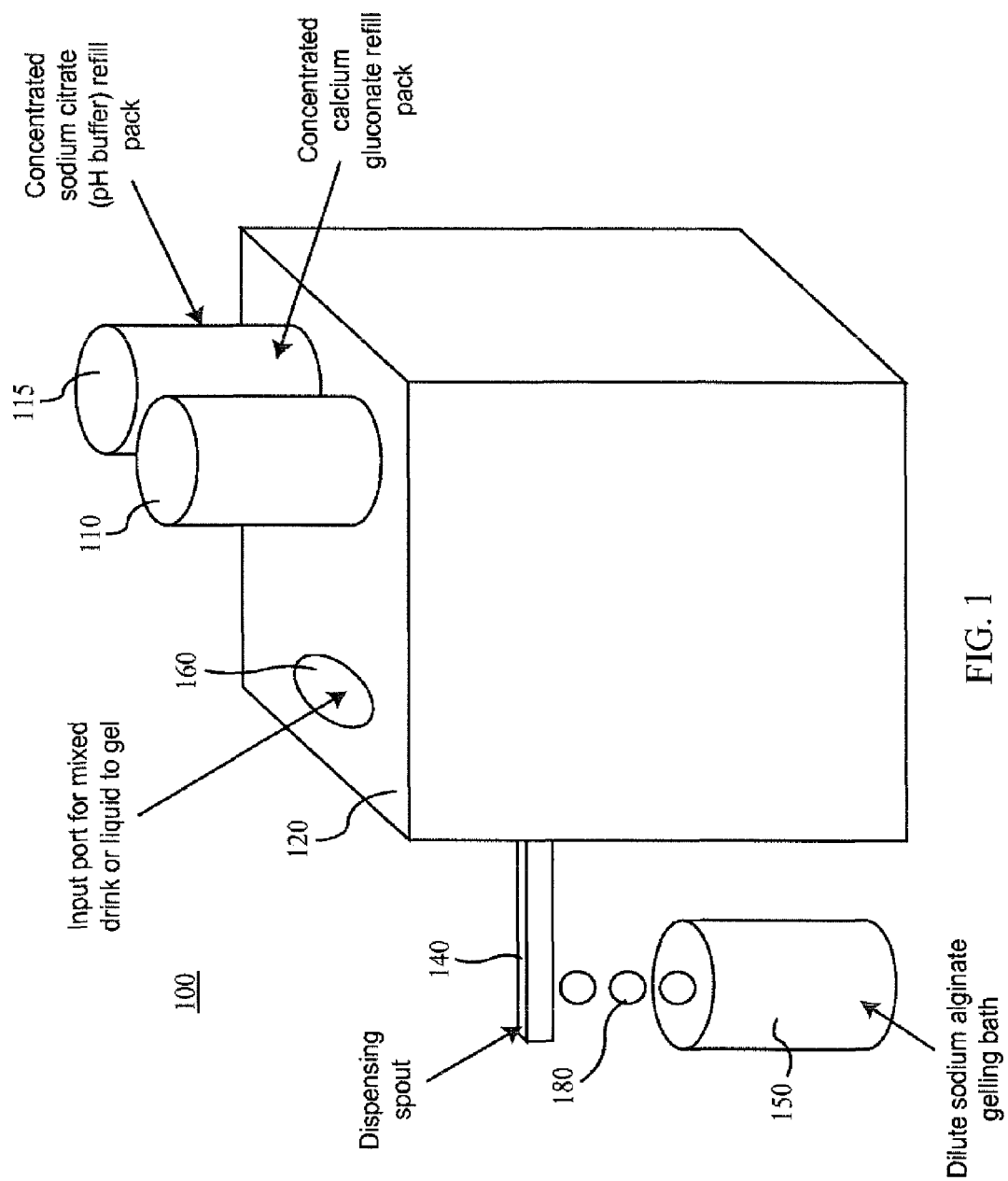
FIG. 1 is a simplified diagram of an apparatus for performing spherification, configured to operate according to an embodiment of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

Overview.

We describe a method and apparatus for automating the production of large amounts of edible pearls of various liquids, with or without solid particulate additives, in a relatively short amount of time as compared to the manual method that is the state of the art. We automate the processes known as "spherification," "reverse spherification," and "inverse spherification." These processes can be used to produce edible pearls also known as "gelled pearls," "faux caviar," "fruit caviar," and other names.

The process of making gelled pearls consists of combining the liquid to be gelled (the substrate), with a gelling agent (such as sodium alginate), and a salt bath to cross-link the starch (usually calcium chloride, calcium lactate, or calcium lactate gluconate). Because gelling is frustrated by low pH (acidic) liquids, an edible pH buffer (often sodium citrate) can be added to increase the pH level to ensure that the gelling process isn't impeded by a low pH solution.

We automate this process using a proprietary apparatus integrated with proprietary refill packs, thus enabling any preparer to produce wonderful pearl concoctions with little or no training. As an example, a bar patron can simply select a beverage from a display coupled with the apparatus, on his/her own tablet, and activate the automated process on the apparatus to produce a tasty pearl beverage. This novel method ensures consistent quality control in the taste, shape, and texture of the pearls, even when produced in large batches.

Overview—Spherification and Reverse Spherification.

Figure 18:
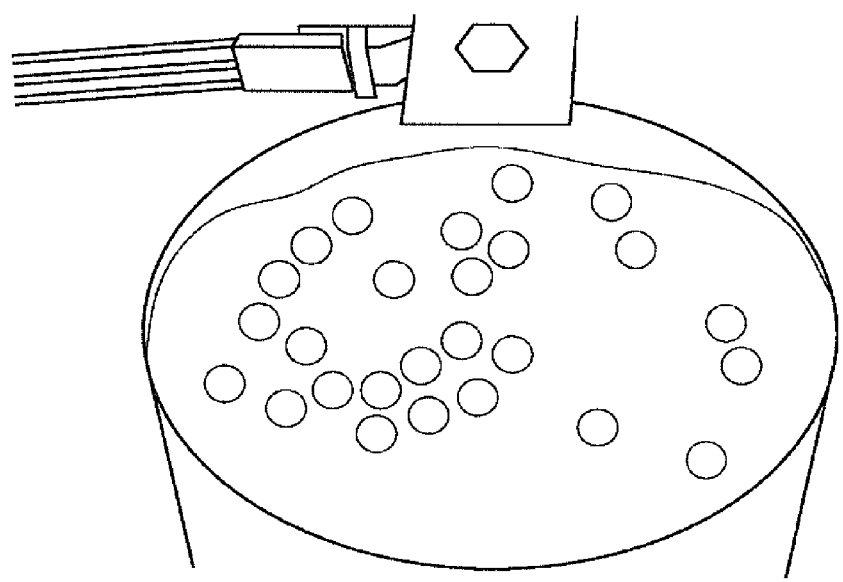
FIG. 18 shows the pearls in the gel bath, according to an embodiment of the present invention.

Spherification (or normal spherification) consists of dissolving the gelling agent (sodium alginate or any future improved gelling agents developed or owned by any third party) into the substrate, and dripping it into a bath of the gelling agent (calcium-ion bearing liquid). This process can suffer from excessive gelling, where the pearls become too hard (gelled all the way to their core), or the gelled skin gets too thick. Pearls that have gelled too much will tend to sink. This is due to continued diffusion of calcium ions through the gelled skin. The process can be stopped by 'shocking' the pearls, or raising their temperature to 85 degrees Celsius, for a short period of time, about 10 minutes. FIG. 18 shows the pearls 180 in the gel bath 150.

Reverse or inverse spherification consists of dissolving the calcium ion source into the substrate, and dripping it into a gelling agent such as a sodium alginate-bearing solution. This method has the advantage of producing a relatively constant skin thickness, resulting in a more standardized product. It also allows for a greater variety of liquids, such as dairy, fats and alcohols, to be gelled more consistently.

Overview—Uses.

Gelled pearls have a wide variety of uses in food/beverage preparation, nutraceutical (food products having health benefits), medicinal, and botanical applications, to name a few. In the remainder of this document we will focus primarily on the food/beverage and nutraceutical applications. In botanic applications, the gelled pearls can be prepared with plant nutrients and water and placed in a vase for both their aesthetic appeal and to "water" the plant. The gelled pearls provide a time-release diffusion of vitamins and water into the vase to maintain the freshness of flowers and plants.

Apparatus Description.

Referring now to the drawings and to FIG. 1 in particular, we show an apparatus 100 for producing gelled pearls, according to an embodiment of the present invention. The apparatus 100 turns ordinary liquids into gelled pearls, with little human intervention. The apparatus 100 according to the invention is a smart device capable of communicating with its own internal components and also with remote devices, such as mobile devices. The apparatus 100 can perform both spherification and reverse spherification. In either case, the machine 100 is shown here in its most basic form. Additional attachments and upgrades to the machine will be discussed later with reference to other embodiments of the apparatus 100.

The apparatus 100 works with a number of packs of a novel concentration of the solutions required to perform spherification and/or reverse spherification. This apparatus 100, one embodiment of which can fit in roughly one cubic foot of volume, contains all the necessary components to turn any input liquid of any pH and/or alcoholic content into flavored gelled pearls 180. This is suited to both individual drinks (alcoholic and non-alcoholic beverages) such as those served in bars and mass-production of foodstuffs and garnishes (such as in restaurants, fast-food chains, catered affairs, and individual consumers), and medicines, along with plant nutrients.

In the embodiment of FIG. 1, we show three packs of solutions 110, 115, and 150. Pack 115 contains a concentrated solution of sodium citrate to act as a pH buffer and acidity reducer. pH buffering is needed because a pH level below five makes gelling difficult. Pack 110 contains a concentrated solution of a salt bath such as calcium lactate gluconate (a tasteless source of calcium) for reverse spherification, or a cross-linking starch such as concentrated sodium alginate for regular spherification. Tank 150 will hold a gelling bath solution of sodium alginate, a cross-linking starch, or a calcium ion solution. Tanks 110 and 115 are refill packs that can be changed as needed. We propose various embodiments of the apparatus 100 with anywhere between one and four+ different types of refill packs (to be discussed with respect to FIG. 24).

With spherification, the input liquid is mixed in the tank 150 with a gelling agent such as sodium alginate. A buffer such as sodium citrate is added if necessary to regulate the pH level of the mixed solution. Then, the mixed solution is dispensed in droplets into a salt bath such as Calcium Chloride or Calcium Lactate.

When using reverse spherification, we mix the input liquid in the tank 150 with a salt solution such as Calcium Lactate Gluconate. A buffer such as Sodium Citrate can be added to regulate the pH level, as in the regular spherification process. The mixed solution is dispensed as droplets into a gelling bath such as diluted Sodium Alginate.

The packs 110 and 115 are removably coupled with the machine 100 via a proprietary attachment. The attachment for the refill packs can be a nozzle (shown in FIG. 4C) or other attachment system that provides a secure fit without spillage. In addition, the attachment system provides one of four levels of security associated with the apparatus 100, to be discussed below.

After processing in the machine 100, droplets of mixed liquid can be counted and dispensed from the machine 100 into the gelling (salt) bath 150. The gelling bath 150 can be temperature-controlled to retard or slow down the gelling process. For example, the gelling bath 150 can be heated to a temperature of approximately 85 degrees Celsius. Heating deters the continuation of gelling. For regular spherification, this gelling bath 150 will be a Calcium ion-bearing solution, normally diluted Calcium Chloride or Calcium Lactate. For reverse spherification, this gelling bath 150 will be a gelling agent such as a cross-linking starch, normally a diluted Sodium Alginate solution.

To begin the gelling process, a preparer pours a flavored liquid or a combination of liquids of any kind into the machine 100 through an ingress port 160. The preparer can be a bartender, chef, kitchen staff member, fast food employee, barista, patron, or an at-home user, among others. The apparatus 100 will automatically analyze the input liquids in order to both reduce the acidity to a suitable level and mix the appropriate proportion of gelling agents or calcium ions with the liquid to generate a pre-pearl processed solution. The correct amount of solution to use can be based on readings from pH sensors, ethanol sensors, and the like to optimize proportions and pH levels for proper pearl production. The pre-pearl processed solution is then automatically dripped out a nozzle (or array of nozzles) or dispensing spout 140 (or multiple spouts), into a bath 150 of either a Calcium ion solution or a gelling agent, depending on the spherification process used. The pre-pearl processed solution is dispensed as droplets with a round shape formed from surface tension.

Apparatus Description—Ports.

The liquid(s) to be spherified is/are poured into at least one hole 160, spout, funnel, chamber, or other ingress port to enter the machine 100. The ingress ports need to be closed when not in use. This can be done with a sliding panel or a top loading panel so that the apparatus 100 and its contents are not contaminated. See FIG. 27.

Figure 3A:
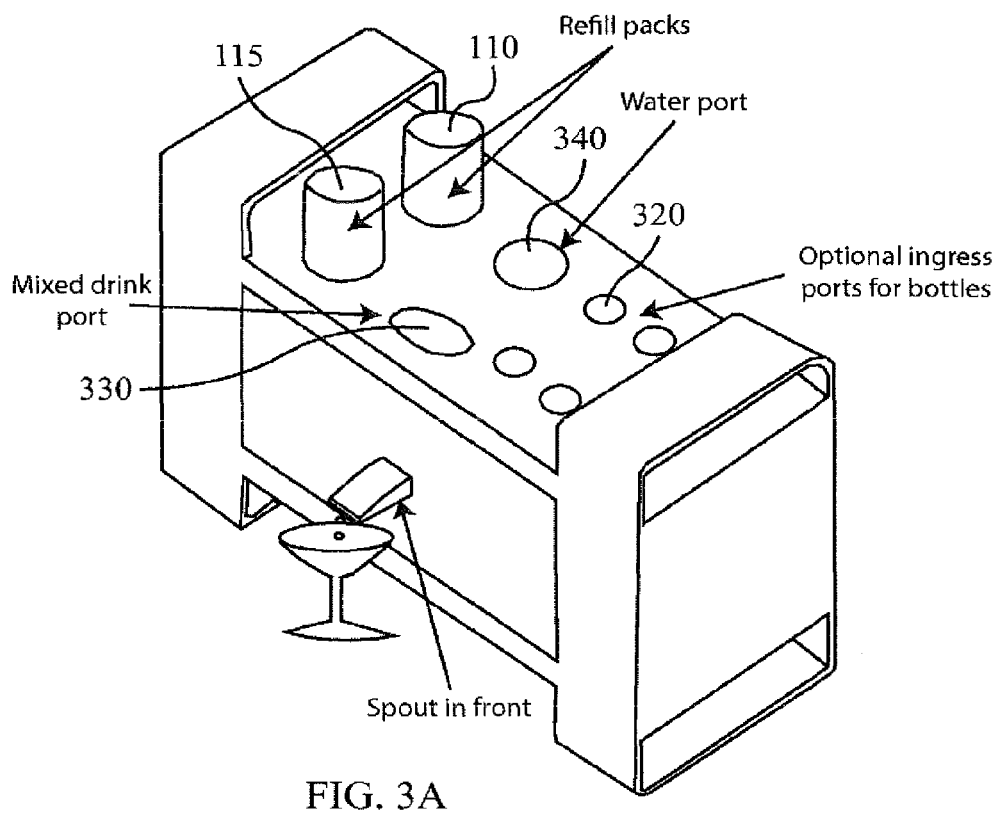
FIG. 3A is an isometric view of the apparatus, according to an embodiment of the present invention.

FIGS. 3A through 3D show different views of the apparatus 100. FIG. 3A shows an isometric view. Arrows show possible positions for liquid input channels, dispenser, and refill packs. The top of the apparatus of FIG. 3A shows multiple optional ingress ports or chambers for introducing liquids. The ports 320, 330, and 340 can be capped when not in use to prevent dust, bacteria, and other particles from entering the apparatus 100. The ports 320 are shaped according to bottle morphology so that a bottle of a liquid can be inverted and inserted into a port 320 to dispense liquid for flavoring the pearls 180. The apparatus 100 can use any number of ports 320. Four are shown in an embodiment that accommodates bottles of vodka, rum, gin, and whiskey for dispensing liquor-flavored pearls.

The mixed-drink port 330 is shown here in an oval shape to accommodate mixed beverages such as a mojito. The water port 340 shown in this embodiment is round to accommodate a gallon container of water for those occasions, such as catering events, when tap water is not available from a hose or spigot. The water port 340 may or may not incorporate a filter for removal of unwanted soluble and/or particulate species from the incoming water stream. It is to be understood that the sizes and shapes of the ports shown here are shown for illustrative purposes only and to enable one with knowledge in the art to understand the invention. They should not be construed as limiting the invention to the size, shape, and number of ports shown here.

Apparatus Description—Interior Components.

Figure 2:
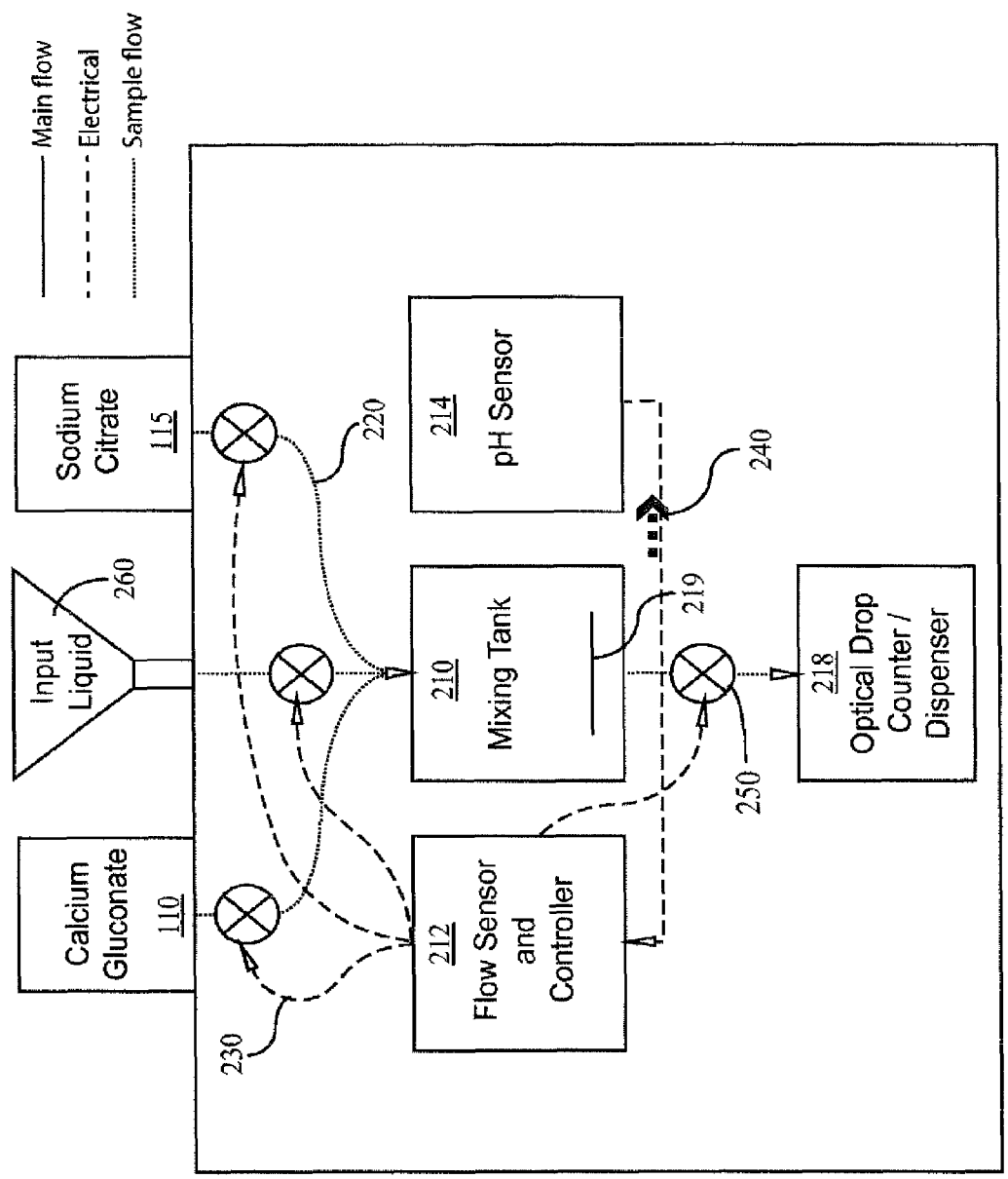
FIG. 2 is a cross-section of the apparatus of FIG. 1, according to an embodiment of the present invention.

Referring now to FIG. 2 we show a cutaway of the major components of the machine 100. Main liquid flow lines 220 are shown in thick bold black lines, electrical signals (analog or digital) 230 are shown in thin black lines, and liquid sample lines 240 for pH and ethanol content measurement are shown in as a dotted arrow, for illustration purposes only. One with knowledge in the art will appreciate that the apparatus 100 can also measure the density and viscosity of fluids, among other things. Liquid flow valves 250 are indicated by circles with crosses through them. Liquids emanating from refill packs will be dispensed through the channels (valves) into the gelling bath. Some liquids, whether dispensed from a refill pack (110, 115) or dispensed from a container provided by the user, flow through channels into the mixing tank 210 first. At first, only the liquid 260 supplied by the user enters the mixing tank 210. Large volumes of the user-supplied liquid 260 can be automatically processed by controlling the valve 250 on the input liquid's flow line 220.

After liquid input, a pH level indicator such as the pH sensor 214 takes a pH measurement of the liquid in the mixing tank 210, and dispenses a concentrated buffer solution such as sodium citrate to bring the pH level to a suitable level for gelling. The mixing tank 210 can be formulated from a clear material such as Lucite (polymerized methyl methacrylate). A citrate buffer can be used to regulate the pH level, rendering a pH sensor unnecessary. Then the flow controller 212 measures the correct amount of calcium gluconate containing solution to add enough calcium ions to the mixed solution for gelling. Inside the mixing tank 210, the liquid is quickly mixed using a blending/mixing mechanism such as, inter alia, a magnetic (contactless) stir bar or a blade. The stir bar can be a teflon-coated magnet, spun by a spinning magnet underneath the mixing vessel 210.

The liquid is then dispensed in individual drops or an array of drops by a dispenser 218. If using a multi-funnel spout 30, 60, 90 drops at a time can be dispensed (see nozzle array shown in FIG. 26). Each drop can be counted as it is dispensed by an optional optical drop counter. The optical drop counter uses a contactless, waterproof drop counting system. In one embodiment of the present invention, the dispenser 218 is coupled with an optical drop counter such as a photo detector using an infrared (IR) beam beneath the spout 140. It can also be a laser (IR or visible). When a droplet is released it breaks the beam and a counter (not shown) is incremented by one. In other embodiments we can incorporate a photodiode using either ambient light or an external light source, such as a focused LED or light bulb, or a capacitance sensor, which changes capacitance as a drop passes through the plates.

Figure 10:
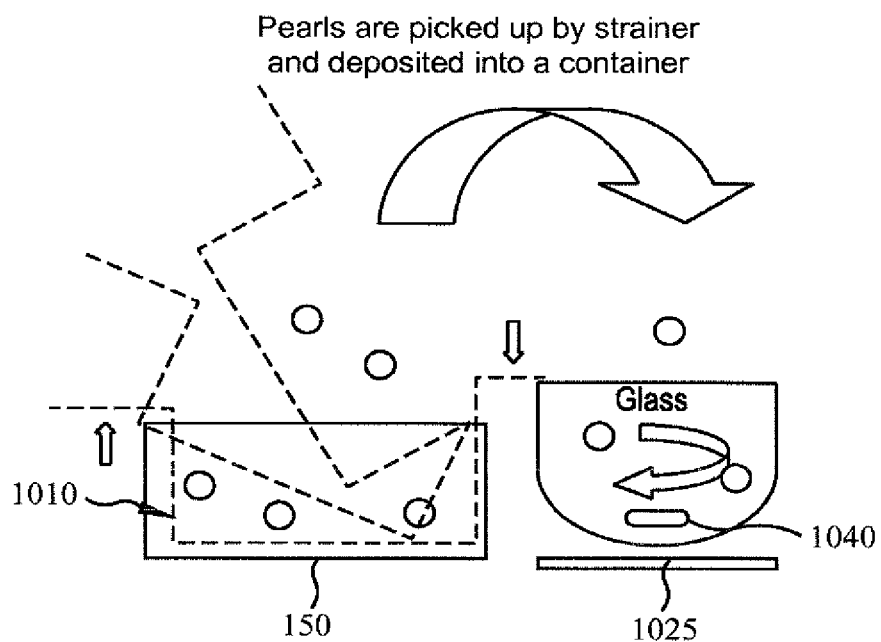
FIG. 10 shows a strainer and a coaster, according to an embodiment of the present invention.

The optional drop counter resets automatically for each serving. A strainer 1010 disposed within the bath container 150 (side view shown in FIG. 10) can be used to remove the pearls 180 from the bath solution to be washed with a cleaning solution, such as clear water. In one embodiment of the invention, the strainer 1010 is similar to a deep tea strainer and fits into the bath 150 with a handle or two for easy removal. Once the pearls 180 are formed, the strainer 1010 can be lifted out of the tank 150 to remove the excess sodium alginate and have dry pearls 180 poured into the beverage glass or container of your choice. In a fully automated embodiment, a lever can be coupled with one handle of the strainer 1010 and lift it up and out of the tank 150 such that the pearls 180 fall into a container placed next to the tank 150. The apparatus 100 can be programmed to strain and pour the pearls 180 after a pre-programmed amount of time in the tank 150.

Apparatus Description—Microprocessor.

Figure 5:
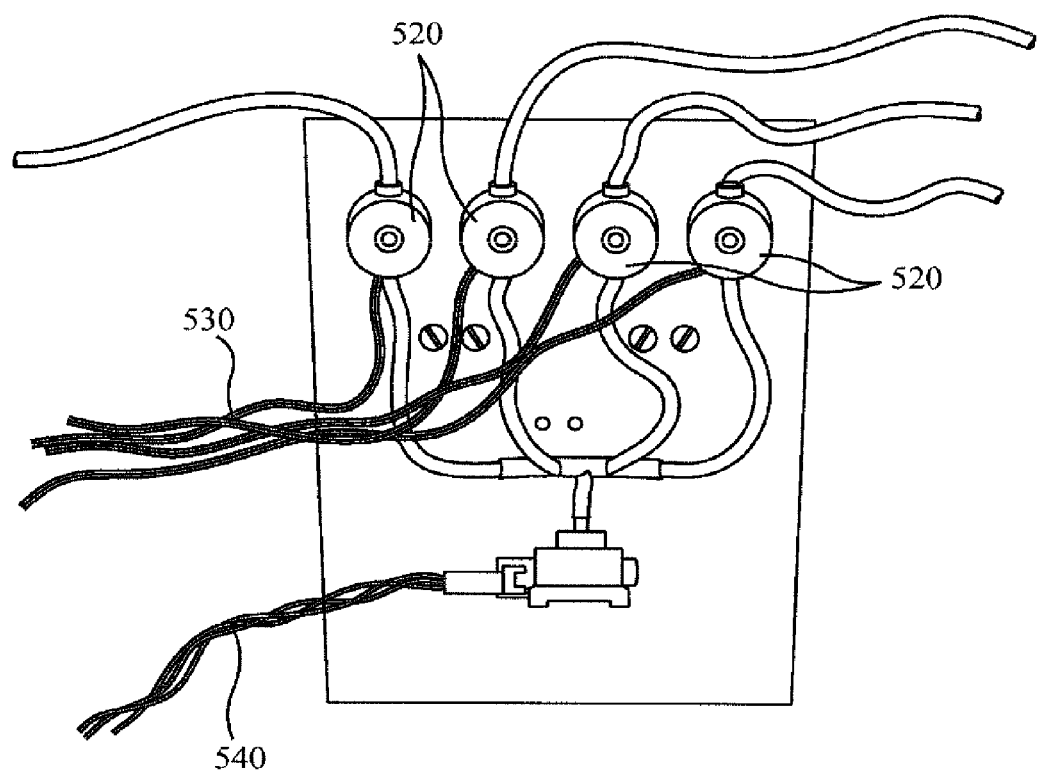
FIG. 5 shows the valves and wiring of the apparatus, according to an embodiment of the present invention.

FIG. 5 shows four solenoid valves 520 connected to red wiring 530 which connect to the microcontroller 212 (shown in FIG. 6) in one embodiment of the present invention. In an embodiment of the invention, the valves 520 are constructed of bacteria-resistant PTFE Teflon designed for high tolerance of water and alcohol mixtures. The photodetector 218 and spout 140 (without cover) is located below and has a red-yellow-black cable 540 connecting it to the microprocessor 212. One with knowledge in the art will recognize that the microcontroller 212 will of necessity include at least a processor and memory operatively coupled with a sensor.

Figure 6:
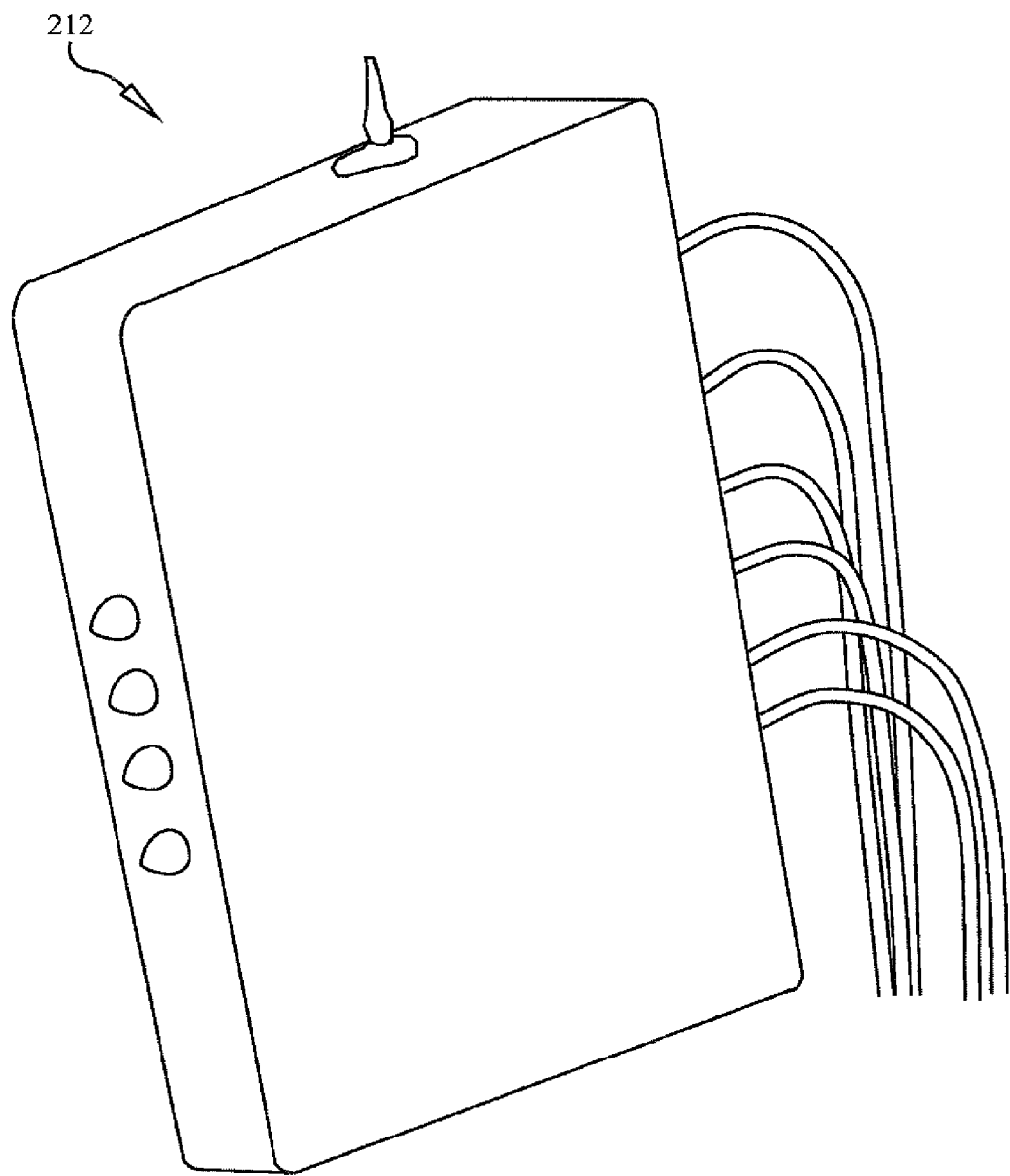
FIG. 6 shows the flow sensor/microcontroller, according to an embodiment of the present invention.
Figure 7:
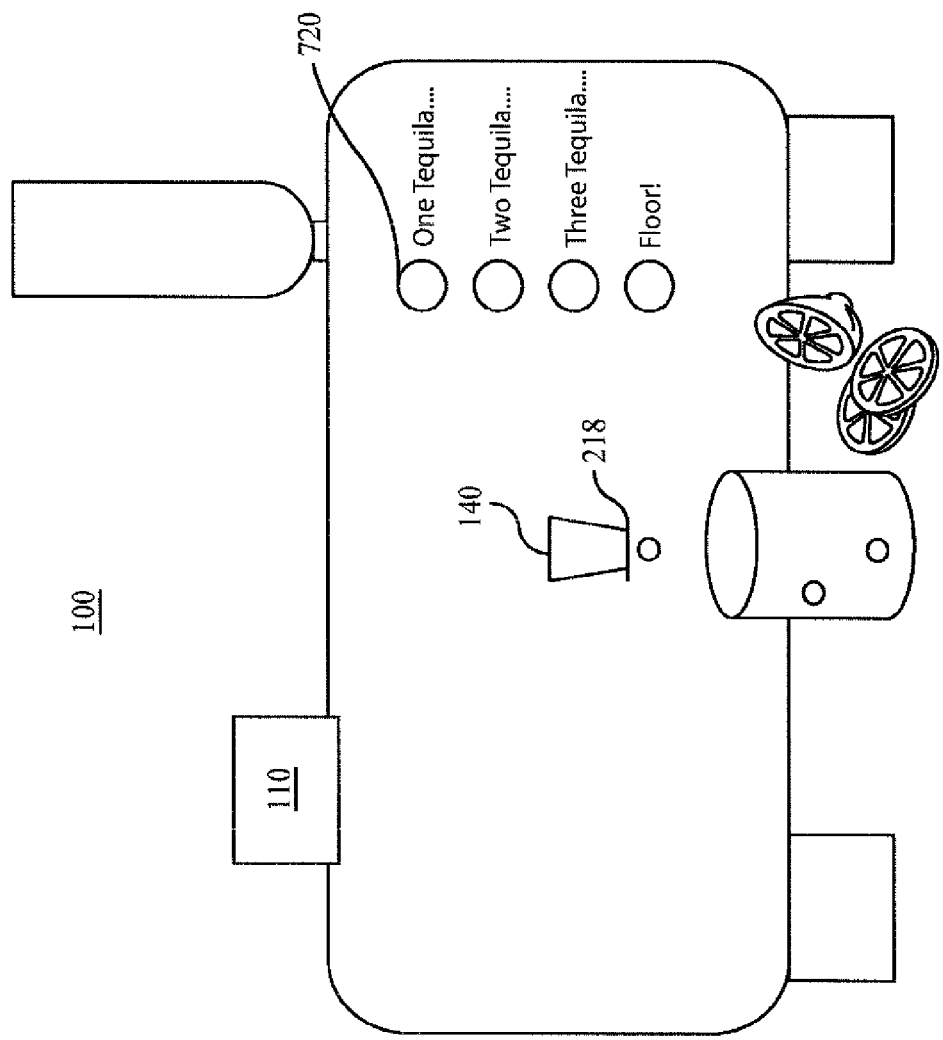
FIG. 7 shows one example of LED indicators, according to an embodiment of the present invention.
Figure 8:
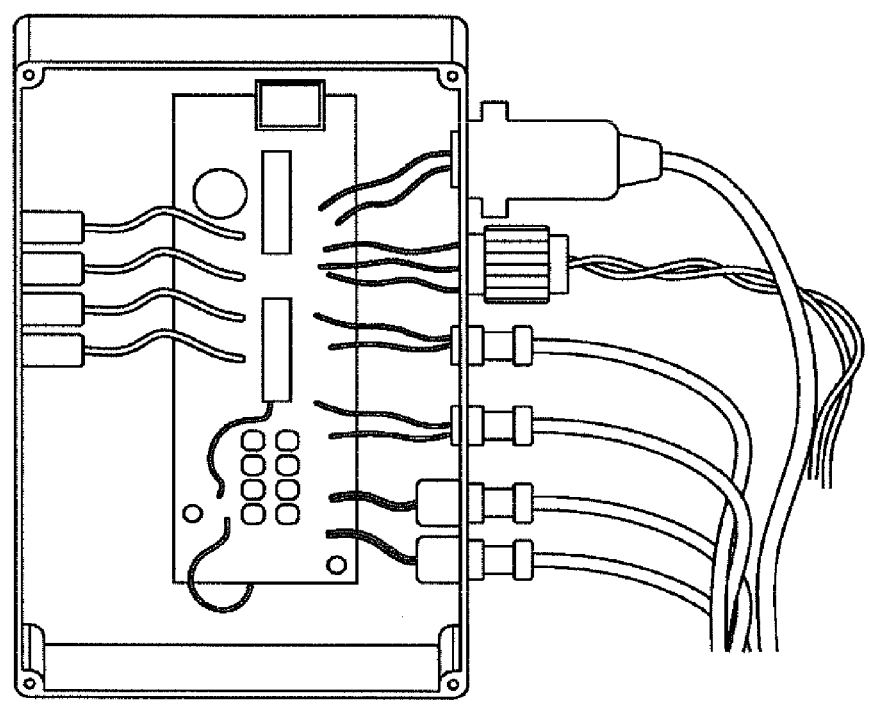
FIG. 8 shows the chipboard inside the microcontroller, according to an embodiment of the present invention.
Figure 9:
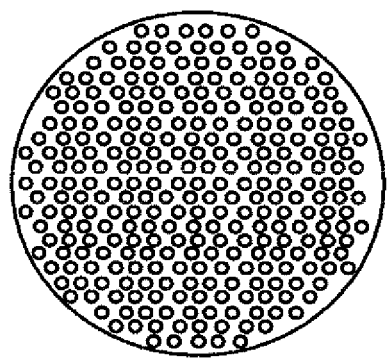
FIG. 9 shows a water impurity filter to be used with all water junctions to improve the water quality as needed, according to an embodiment of the present invention.

FIG. 6 shows the brain of the apparatus 100, the microcontroller 212, with LED indicators that show which component of the machine is currently operating. One with knowledge in the art will appreciate that the indicators can be housed in a casing that provides a more enjoyable aesthetic than the simplified box pictured here. For example, FIG. 7 shows one example of a casing wherein the LED indicators indicate the progress of the pearls being made. FIG. 8 shows the chipboard inside the microcontroller 212.

Apparatus Description—Views.

Figure 3B:
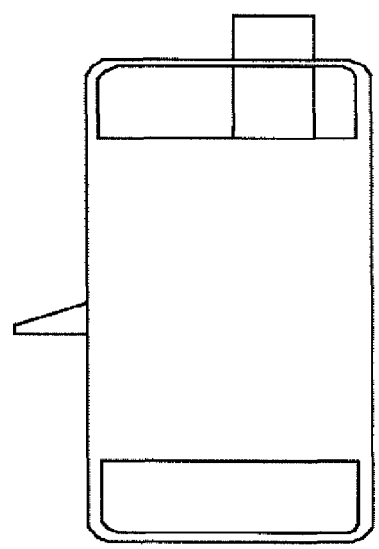
FIG. 3B is a side view of the apparatus, according to an embodiment of the present invention.
Figure 3C:
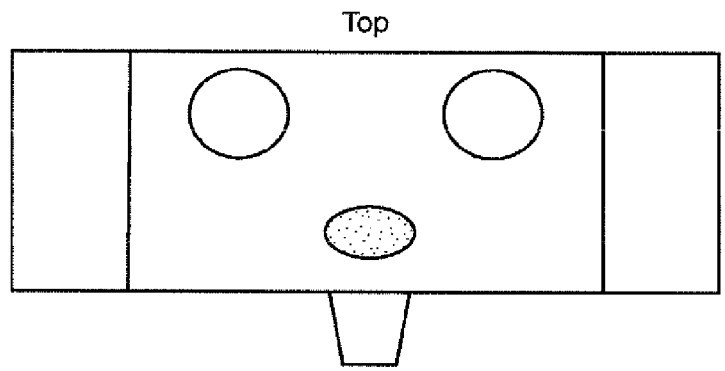
FIG. 3C is a top view of the apparatus, according to an embodiment of the present invention.
Figure 3D:
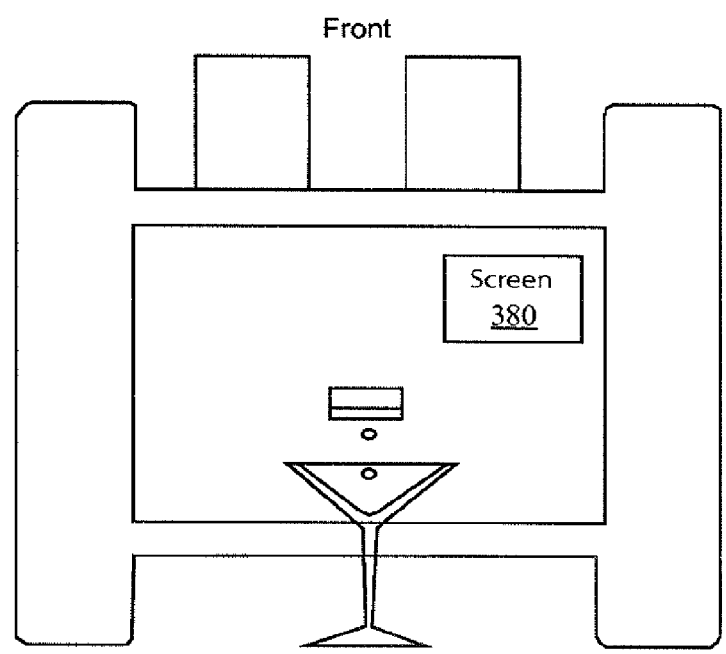
FIG. 3D is a front view of the apparatus, according to an embodiment of the present invention.

FIG. 3B shows a side view. FIG. 3C shows a top view and FIG. 3D shows a front view of the apparatus 100 dispensing pearls 180 onto a glass. A display 380 is shown placed on the front of the apparatus 100. The display 380 can also be placed on the top, side, or back, depending on the placement of the apparatus 100 within its environment. If the apparatus 100 is placed on a bar top front-side out, a back placement will be easier for the bartender. If the patrons are going to be fixing their own pearl concoctions, a front placement of the screen may be preferable.

Figure 4A:
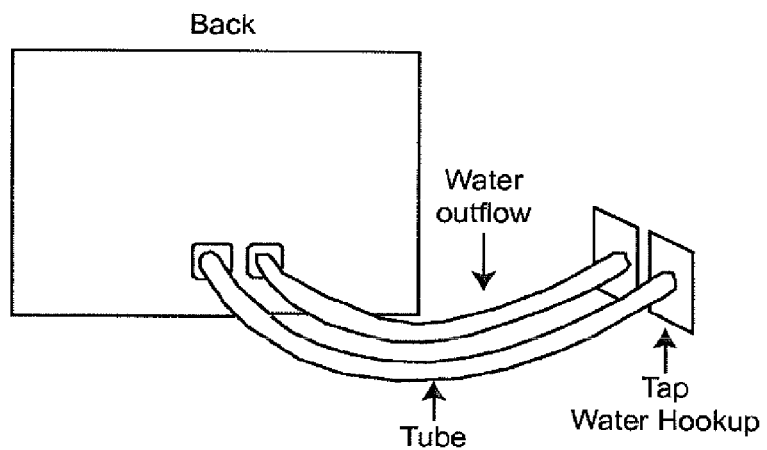
FIGS. 4A, 4B, 4C, 4D, 4E, 4F show views of the components of the apparatus, according to an embodiment of the present invention.
Figure 4B:
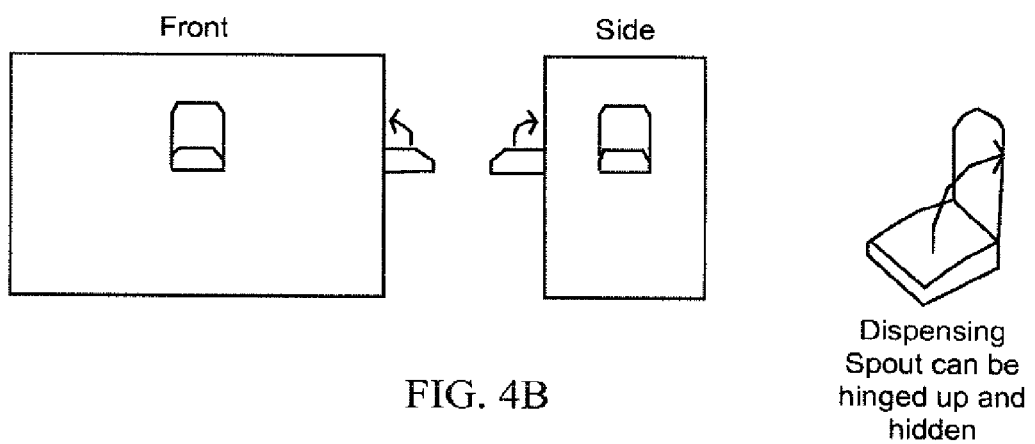

FIGS. 4A through 4F show views of the components of the apparatus 100. FIG. 4A shows a view of the back of the apparatus 100 with liquid flow lines carrying water, or another cleansing agent, in and out of the apparatus 100. FIG. 4B shows two views of the apparatus 100 with the dispensing spout 140 in each view. As shown, the dispenser 140 can be placed in either the front or the side of the apparatus 100. Its placement will most likely depend on how the apparatus 100 is positioned and how much space is available.

FIG. 4B also shows that the dispenser 140 can be hinged to open and close as desired. The height of the dispenser 140 with respect to the bath 150 can be adjusted to optimize the distance between the spout 140 and the dilute sodium alginate solution container 150. The distance between the spout 140 and the bath 150 affects the shape/geometry of the pearls 180. The viscosity of the mixed drink and the Calcium salt solution and Sodium Citrate (if needed) will also affect the shape. To optimize the shape of the pearls 180 we may want to fine-tune the distance between the spout 140 and the alginate bath 150, either by vertical translation of the spout 140 and/or by movement of the water level of the alginate bath 150.

Figure 4C:
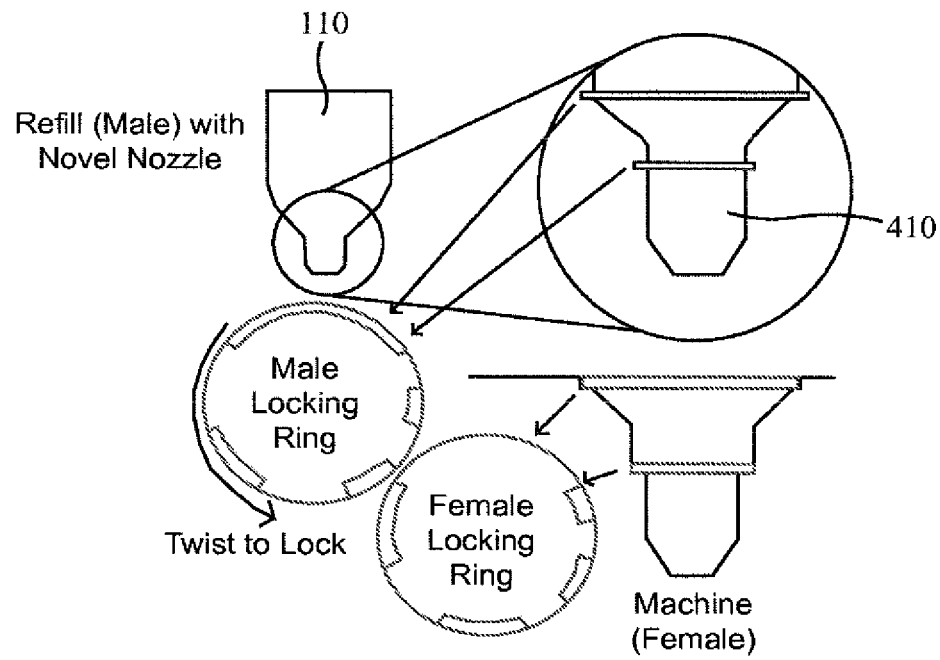
Figure 4D:
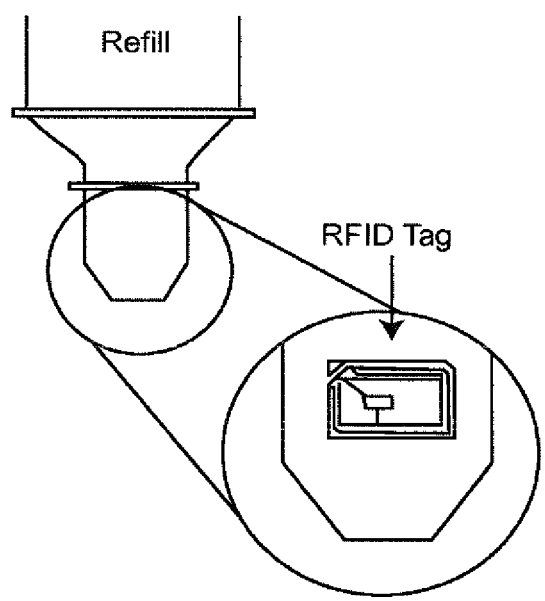
Figure 4E:
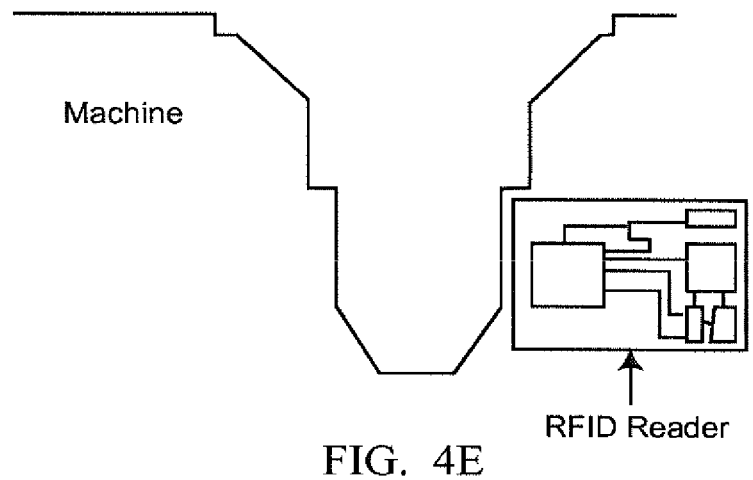
Figure 4F:
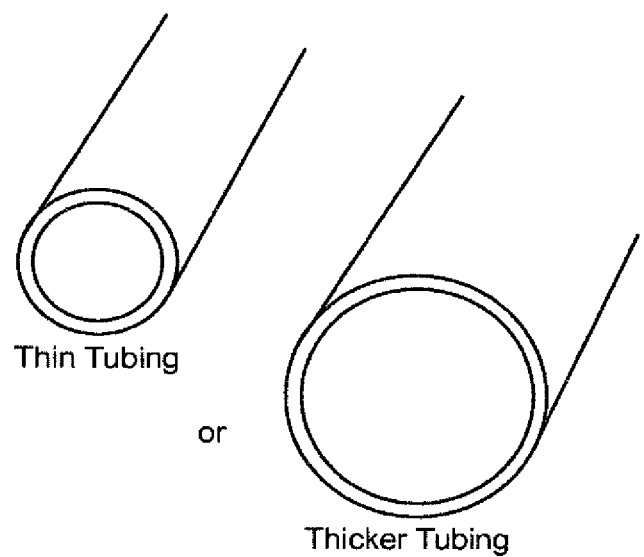
Figure 25:
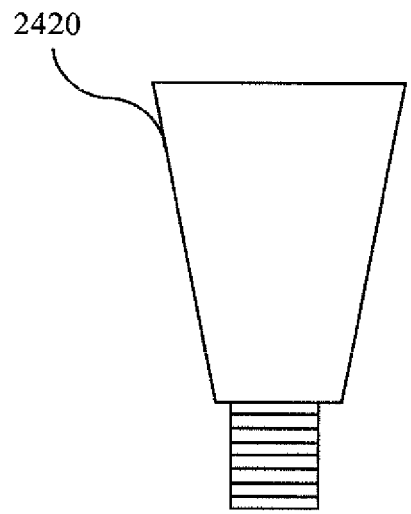
FIG. 25 shows an exemplary illustration of a nozzle for a refill pack, according to an embodiment of the present invention.

FIG. 4C shows one embodiment of the nozzle 410 of a refill pack 110. The nozzle 410 in this example is fabricated with a male locking ring that couples with a corresponding female locking ring of the apparatus 100. FIG. 25, to be discussed below, shows another illustration of a nozzle 410. FIG. 4D shows another level of security wherein an RFID tag is disposed on the insertable portion of the nozzle 410 of the refill pack. The tag attached to the nozzle is read by an RFID reader on the machine 100 that must verify the tag. This will be discussed in more detail in the Security portion. FIG. 4F shows two different sized tubes used in the apparatus 100. The smaller diameter tubing is used to make caviar-sized pearls 180; whereas the larger diameter tubing is used to make gum-ball sized pearls 180. It is important to note that the tubing must be flushed with water or other suitable cleansing agent when switching flavors or application.

Figure 11:
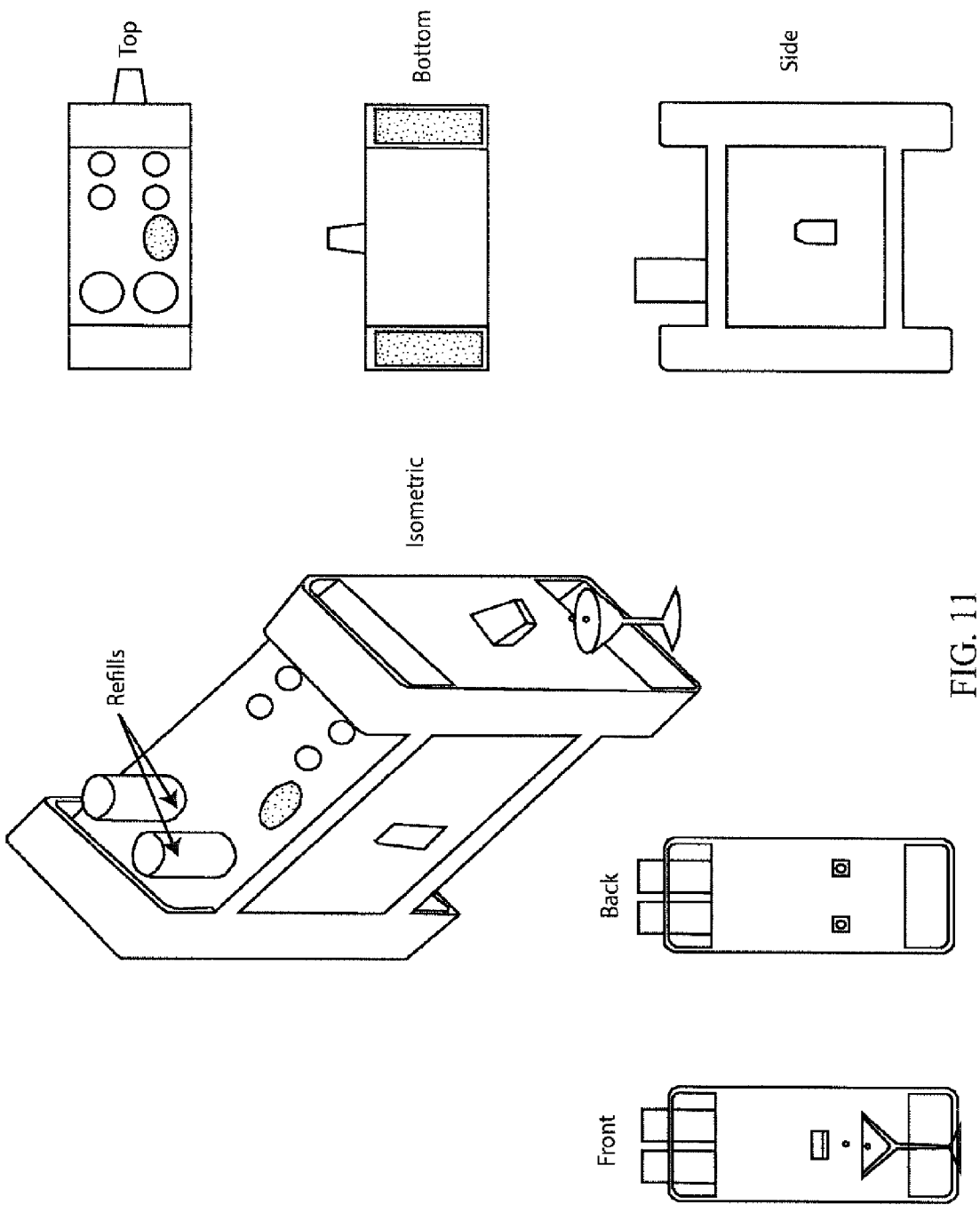
FIG. 11 shows an embodiment of the present invention with a space-saving layout.
Figure 12:
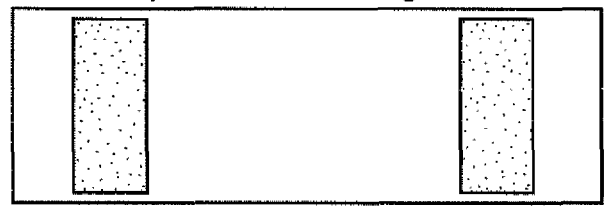
FIG. 12 shows a mounting base, according to an embodiment of the present invention.
Figure 12:
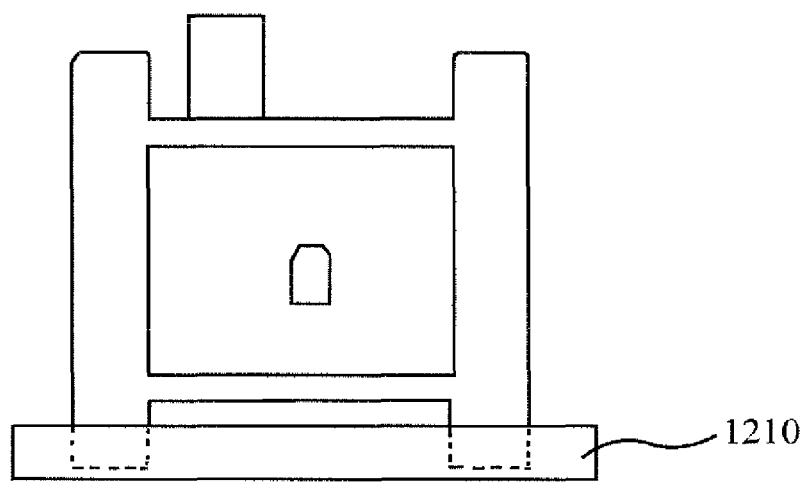
Figure 12:
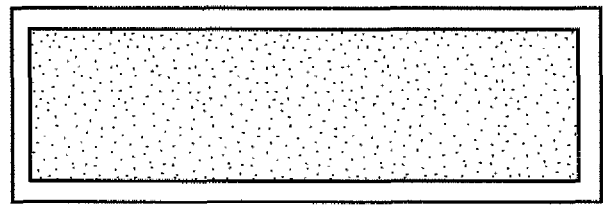

FIG. 11 shows three views of the mounting base 1110 of the apparatus 100. The mounting base 1110 can be permanently affixed to the machine 100 or it can be attached such that it can be easily removed for cleaning and replaced.

Apparatus Description—Housing.

We have not discussed the housing of the apparatus 100. The housing, having been shown in the Figures as a basic rectangle, can be made into different shapes and sizes, according to aesthetics. The housing can be made out of different materials ranging from metals such as aluminum and stainless steel, to ceramics, composite materials, to polymers such PLA (especially if manufactured using 3D printing), as clear lucite or plexiglass, acrylic, and any combination thereof. The choice of housing material will likely be based on a need to comply with food safety standards such as those provided by the NSF (National Sanitation Foundation), FDA (Food and Drug Administration) and EU (European Union). The housing can either reveal or conceal the interior components and tubing. Lighting can be disposed inside a clear housing so that the interior shows up in a bar setting. In one embodiment of the apparatus and the method, a benchtop device is configured to perform automated reverse spherification only. This results in the following complexity reductions:

1. When the refill pack solutions to be processed have viscosities on par with water, this may eliminate the need for a strong pump. Moreover, the refill packs and the dispensing nozzle can be gravity fed, eliminating all pumps. We can also eliminate most valves by letting the pumps act as valves when refill packs are placed upright and the solution travels up against gravity. The two refill packs containing the buffer (sodium citrate) and the gelling bath (a calcium salt such as calcium lactate gluconate) are not growth media for bacteria. This leads to an inherently more food-safe machine that is easier to keep clean.

2. pH sensing of the user's input liquid will not be made more difficult by concentrated alginate coating the probe. We can also eliminate the pH sensor altogether by always adding a fixed amount of citrate buffer.

The above simplifications lead to a simpler design with less working components and a smaller footprint, which has been cited as a primary concern according to our market research. We estimate that a machine with dimensions of approximately 9 inches by 18 inches would be ideal as a countertop device. The above simplifications result in a machine that requires absolutely no user interaction to reliably create uniform pearls of various liquids. The preparer simply pours the liquid in, and pearls come out.

Apparatus—Accessories.

One of the many contemplated uses for this unique spherification apparatus and method is in a bar setting, where accessories can add to the novelty and enjoyment of the pearls 180. Referring again to FIG. 10, one such accessory is a coaster 1025 that activates a magnetic spinner 1040 in a glass. When the glass with the edible pearls 180 is placed on the magnetic coaster 1025, the spinner 1040 causes the pearls 180 to rotate within the glass.

Another accessory is a black light to amplify the natural photo luminescent property of the pearls 180 caused by the Sodium Alginate and/or certain alcohols. Mixtures for the refill packs can be designed to promote/amplify "glow-in-the-dark" capability of edible substances. A black light could be incorporated into the glass or coaster or simply placed nearby.

A filter such as a Calcium ion filter can be used to minimize impurities from a water source. Water is used to both cleanse the system as regular maintenance, but also to dilute the refill packs when necessary (especially when diluting the substance that will go into the bath. The filter can be packaged separately and coupled with the port 160 when the machine 100 is cleaned.

Figure 26:
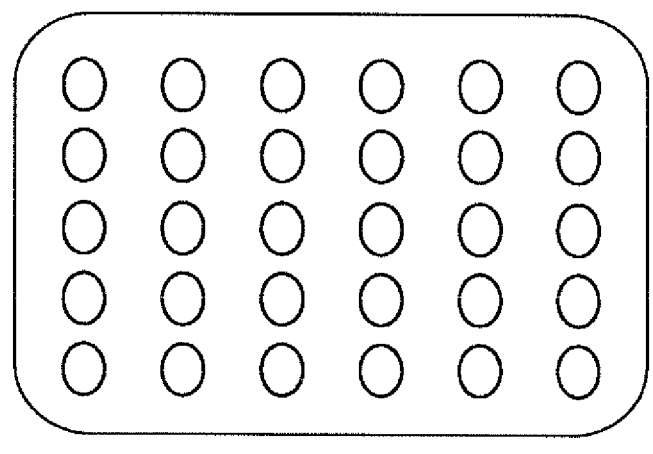
FIG. 26 shows an exemplary illustration of the back of a nozzle array, according to an embodiment of the present invention.
Figure 27:
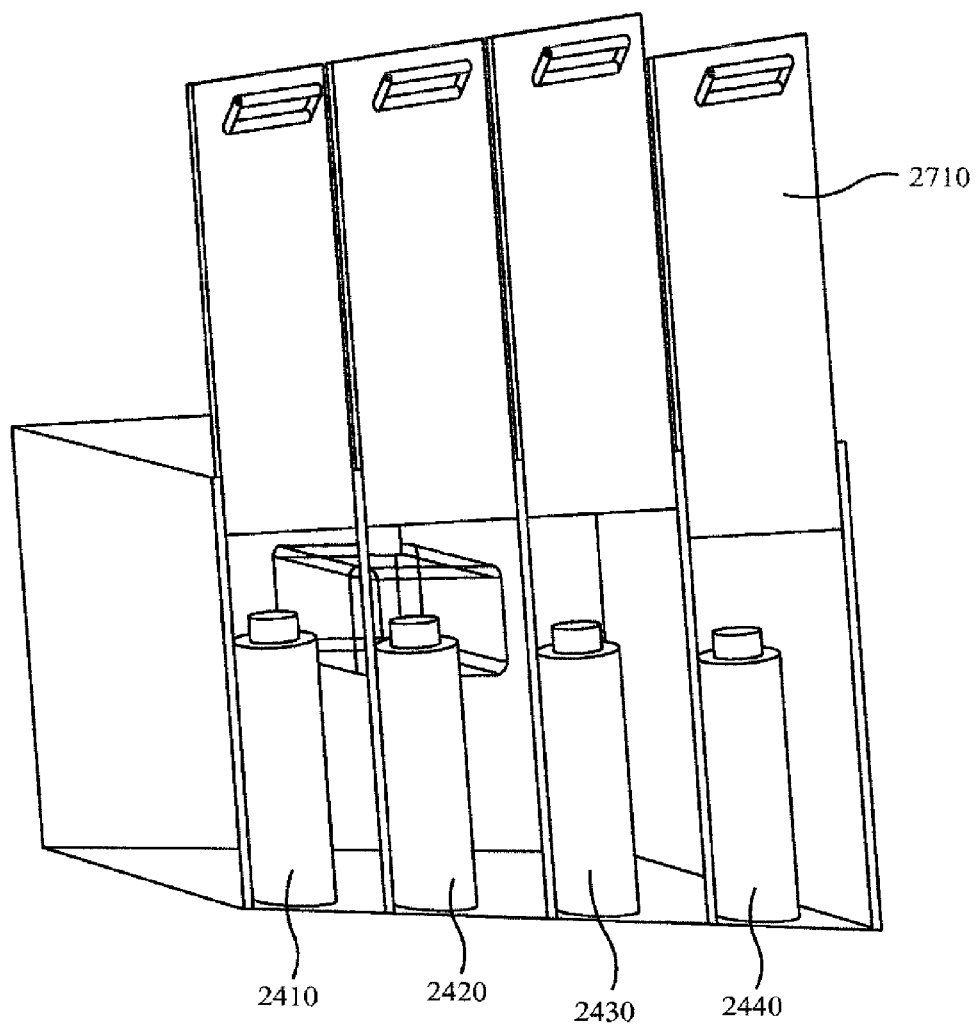
FIG. 27 shows a simplified depiction of sliding panels as part of a locking mechanism, according to an embodiment of the present invention.

FIG. 26 shows a nozzle array that can be used instead of a single spout to make large batches of pearls at one time. Additionally, we can add a locking mechanism to safeguard the liquids. FIG. 27 shows exemplary sliding panels 2710 that can close over the refill packs.

Proprietary Refill Packs.

Figure 24:
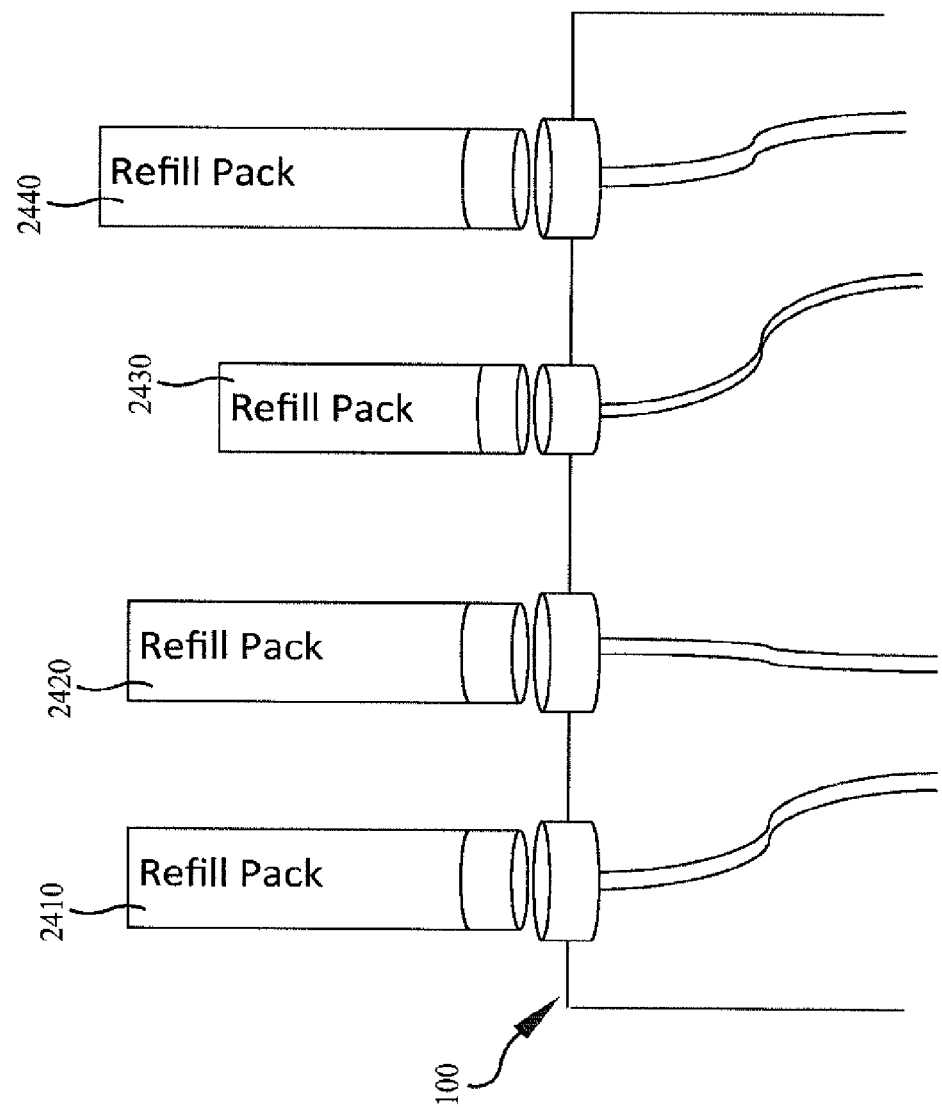
FIG. 24 shows an exemplary depiction of four proprietary refill packs, according to an embodiment of the present invention.

In FIG. 24 we show four proprietary refill packs which are an integral part of the system, according to an embodiment of the present invention. The proprietary refill packs shown here contain: a concentrated liquid solution of a gelling agent/hydrocolloid such as Sodium Alginate in pack 2410; a concentrated liquid salt solution in pack 2420; a concentrated edible liquid pH buffer solution in pack 2430; and a cleansing agent such as water in pack 2440. The salt solution refill pack 2430 contains a salt solution such as a Calcium or Magnesium salt solution.

Each refill pack can be outfitted with a set of three or four LEDs for monitoring. In one embodiments, the pearls are not counted. Instead, each refill pack will provide material to formulate a specified number of pearls. The refill packs attach to the apparatus 100 by a nozzle or collar, an example of which is shown in FIG. 25.

Proprietary Refill Packs—Device Security.

One of the most important features in keeping customers' brand loyalty will be product quality consistency, and this requires robust security for the refill packs. The proprietary refill packs must be recognizable by the machine 100, must be refill-resistant, and should be difficult to reproduce. The method according to an embodiment of the present invention incorporates at least four levels of security. One level is a security feature wherein only proprietary refill packs can be inserted into the apparatus 100. The size and shape of the egress port of the proprietary refill packs conform exactly to the size and shape of the ingress port on the apparatus 100. As shown in FIG. 24 the ports can be color-code or otherwise marked to indicate which pack goes where.

We contemplate increasing security by using a proprietary, one-way flow nozzle, according to one embodiment of the present invention. This will make it impractical for customers (or counterfeiters) to refill empty, but genuine, refill packs with counterfeit products. The screw threads on the nozzle can be made using an odd, non-standard size, left-handed threads, in order to ensure no off-the-shelf systems are compatible. In addition, the shape of the refill packs can be made such that knock-offs will not fit the opening. Another method to use is to supply a thin film on the nozzle of the refill pack which must be punctured to allow liquid flow. A punctured refill pack indicates that it has already been used. We can add a locking electromagnetic mechanism to the apparatus 100, coupled with a sensor to sense when a pack is inserted. We can lock the ingress ports by activating a sliding panel across the ports in a top-loading version.

A second level of security involves the use of digital signature identification, such as Radio Frequency Identification (RFID) refill pack identification using tags in the refill packs. The security system can include a small, unpowered tag disposed somewhere in or on the refill pack, or an RFID label or tag attached to the refill pack. The information on the RFID tag would consist of any of the following or combinations of the following: device identification information, a refill pack serial number, and a "hash," or encrypted code. The apparatus 100 would incorporate an RFID reader. An RFID reader can be affixed near each refill pack chamber in the apparatus 100. It would be able to perform the following tasks in order to validate a genuine refill pack:

1. Identify the existence of the RFID tag in the refill pack;
2. Check to confirm a valid refill pack serial number; and
3. Compute a checksum encoded by the serial number and the "hash" code, to screen out any possible forgeries with counterfeit RFID tags embedded within.

If the RFID reader can't confirm the validity and/or provenance of the refill pack, the microcontroller will not activate the locking mechanism to allow the liquid stream to enter the machine 100. The readout display will show a message such as "Unrecognized refill pack detected. Please replace with a genuine ACME product. If this message has been received in error, please contact ACME at . . . . " In another embodiment of the present invention, a tag can also be used in the ingress ports for the bottles so that only certain bottles are used.

The third level of security is chemical security whereby solutions are purposely made to be highly acidic with a pH lower than five to begin with so that an individual cannot use the proprietary refill packs without the proprietary machine to reduce the pH level. We design a codependency between machine and refill packs and vice-versa.

A fourth level of security centered around the refill packs involves the monitoring of the refill packs, specifically their volume depletion and their replacement. Because the apparatus 100 is a smart device with a microprocessor operably coupled with sensors and the like, it can track the usage of the refill packs. Therefore, the apparatus 100 will know when a refill pack is first inserted (when the seal is broken) and begins tracking at that point. Let's assume a refill pack has a lifespan of four to six weeks yet the monitoring shows that it has not been replaced in six months. This may indicate a problem. We can remotely disable the unlocking of the packs in the event of a recall or if a theft or contamination is suspected.

User Interface.

Figure 21:
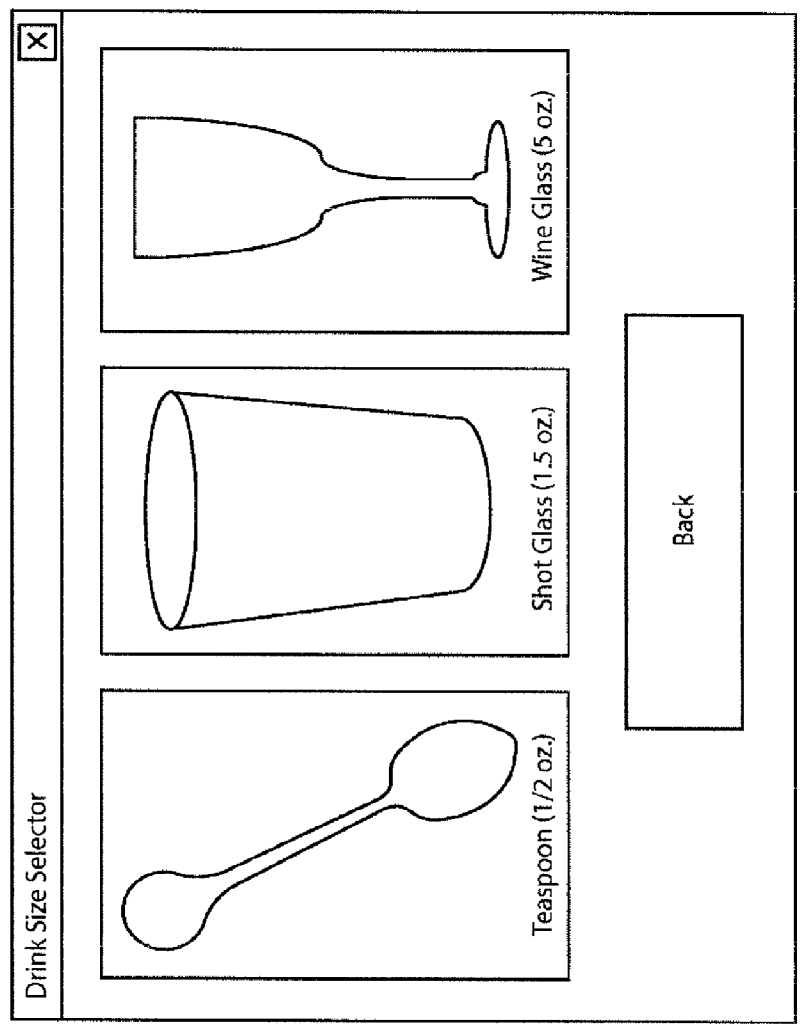
FIG. 21 shows an exemplary portion size selector interface, according to an embodiment of the present invention.
Figure 22:
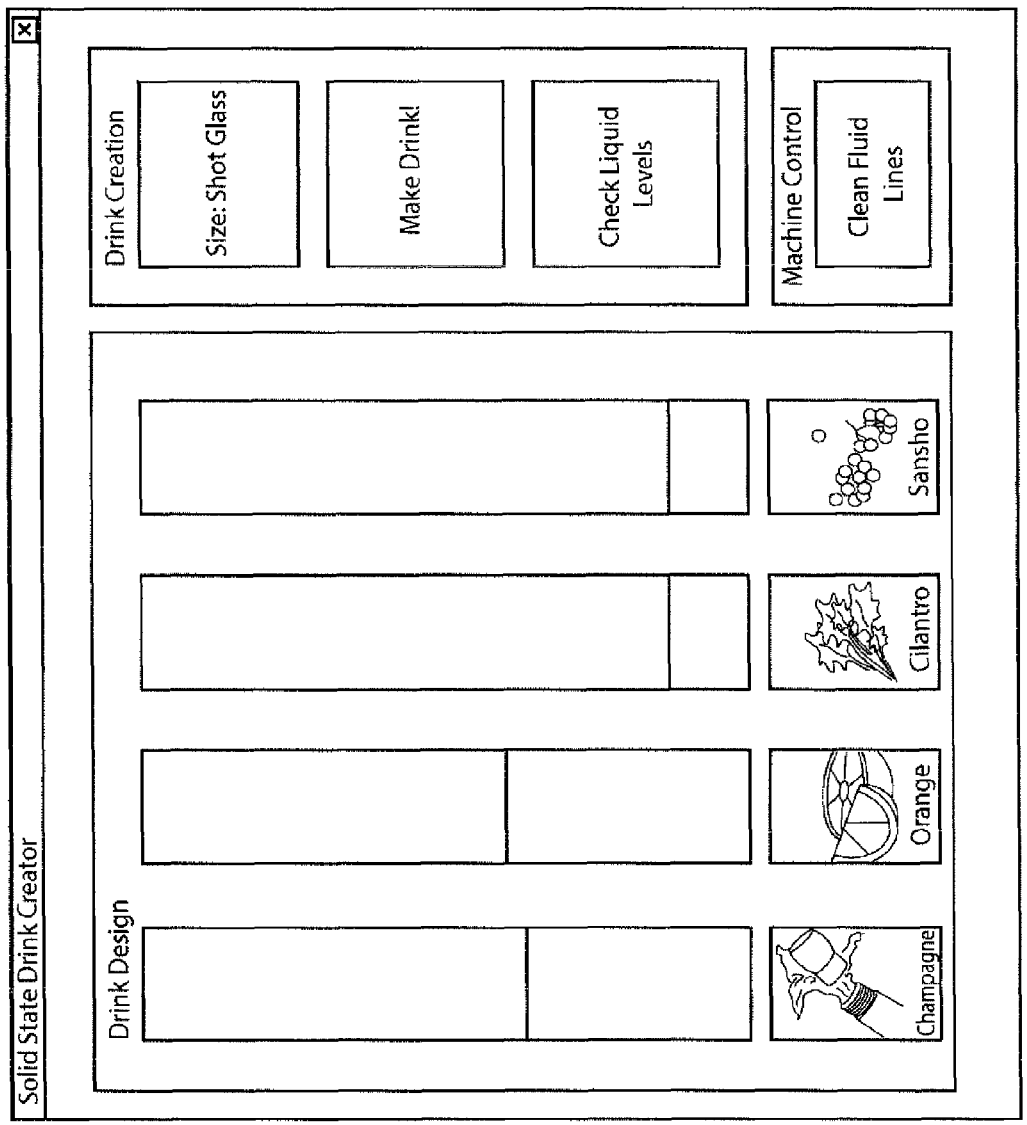
FIG. 22 shows an exemplary drink creator interface, according to an embodiment of the present invention.
Figure 23:
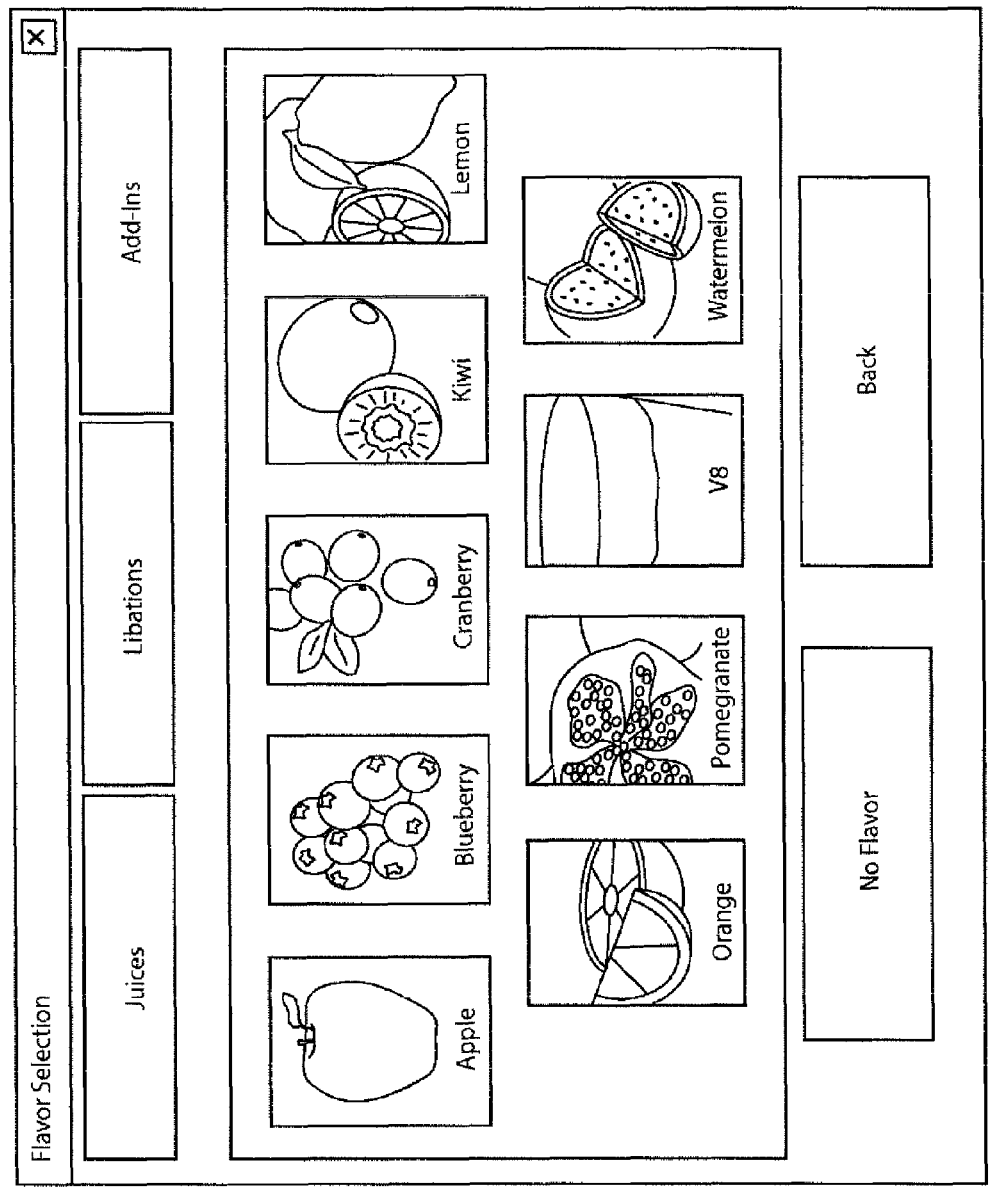
FIG. 23 shows an exemplary flavor selector interface, according to an embodiment of the present invention.

Information about the gelling process while ongoing, as well as the amount of finished product dispensed, can be presented on a display for user feedback. One way this can be achieved is through the use of flow sensors attached to the tubing. The screen is shown in FIG. 3D and exemplary screens showing a portion size selector, a drink creator interface, and a flavor selector are shown in FIGS. 21, 22, and 23. Minimal user interaction is necessary to correctly operate the machine 100. However, the apparatus 100 can be programmed to accept user input to create custom recipes.

The user input can be entered directly on the apparatus 100 itself or can be entered via a wireless device in operative communication with the apparatus 100. After the mixed liquid is dispensed, subsequent batches of remaining unprocessed user liquid can be processed in a serial fashion. When the refill packs (110, 115) run low, the user is prompted to replace them in much the same manner as a printer prompts a user to replace an ink cartridge. We can use a flow sensor or photodetector to monitor the levels and know when the supply is running low in the refill packs. We can have new orders shipped automatically through remote communication with machines via a communication source, such as the Internet.

Figure 13:
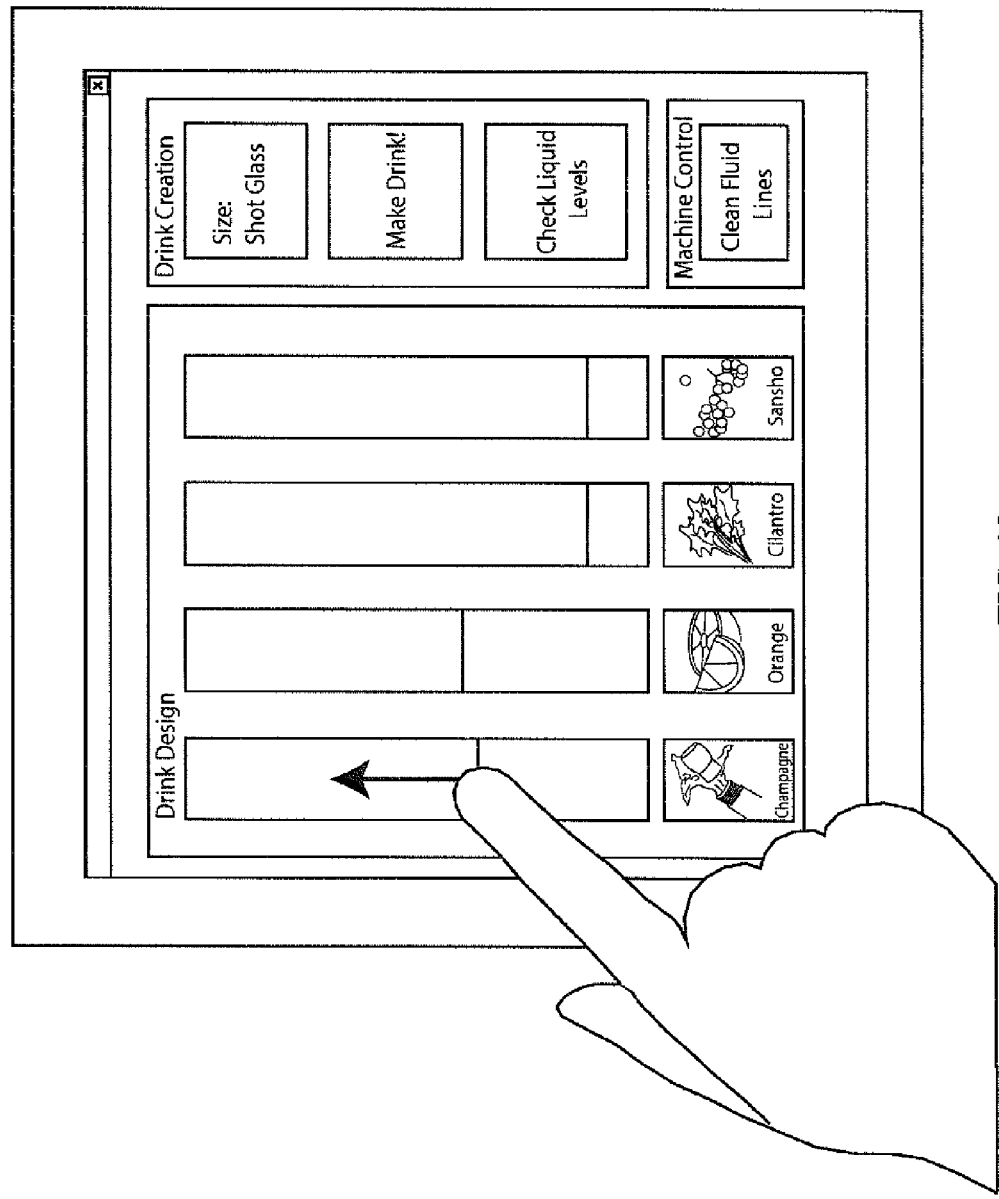
FIG. 13 shows a user interface for adjusting the proportion of ingredients, according to an embodiment of the present invention.

FIG. 13 shows an exemplary user interface wherein a preparer can interact with the apparatus 100 and adjust the proportion of liquids in a beverage or food product to be gelled. For example, assume that the preparer is a patron at a bar who wishes to use the apparatus 100 to make a gelled margarita. Using a mobile phone or other device such as a tablet computer (the bar may provide a tablet computer for patrons to use), the patron can scan a menu of both food and beverages and select an item of choice to be made into pearls 180. It is to be appreciated that the patron will also be able to pay for the item directly from the tablet or phone. Once the food or beverage is selected, the apparatus 100 will retrieve a corresponding recipe. Recipes can be retrieved from local storage within the apparatus, or recipes can be retrieved from a remote data store via wireless channels.

Once the recipe is known, the interface 1370 displays the levels or proportions of each ingredient it will use to make the recipe. Since this preparer has chosen margarita pearls, the apparatus 150 will display the three main ingredients: tequila, Cointreau, and lime juice. The interface 1370 will also display the proportions of each ingredient, adding up to 100%. At this point, the preparer is able to customize his/her pearl concoction. Let's assume the preparer prefers less tequila, he/she uses the interface 1370 to adjust the levels, so that the tequila level is decreased. The apparatus 100 will automatically adjust the other ingredients accordingly to achieve the desired flavor. The apparatus 100 will dispense and mix the correct amount of flavored liquids (tequila, Cointreau, lime juice), mix with a gelling agent, adjust the pH level, and dispense into a gelling bath such as a salt bath. Once the pearls are in the salt bath for a predetermined amount of time, a strainer is activated to lift the pearls out of the gelling bath. They are then rinsed and pour into a container such as a glass. The entire process has occurred without any intervention by the preparer.

Figure 14:
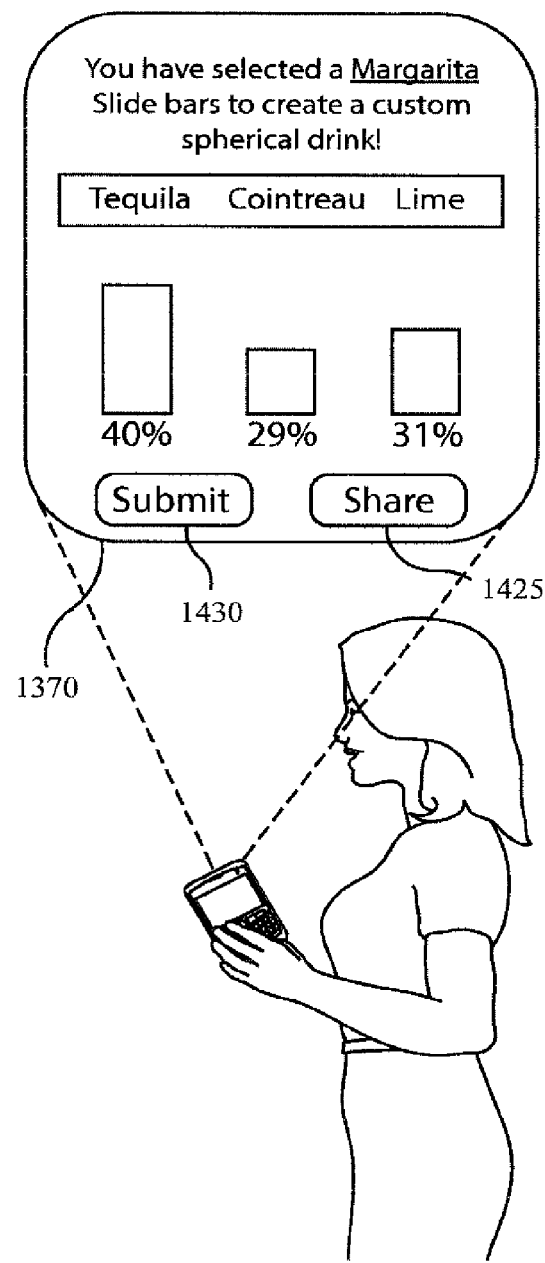
FIG. 14 shows the interface in use on a user device, according to an embodiment of the present invention.

FIGS. 21, 22, and 23 show three examples of what the preparer is likely to see on a user interface in operative communication with the apparatus 100. FIG. 21 shows a display where a preparer can select a portion size and FIG. 22 shows a display where a preparer can interact with the apparatus 100 to make a pearl concoction from start to finish. FIGS. 22 and 23 display a few of the extraordinary variety of flavors and ingredients that can be combined, including herbs such as cilantro. The user is able to adjust the proportions of the ingredients by known methods of touch screen technology, or by a scroll bar, text input, or other means. The interface 1370 can be affixed to the apparatus 100 or it can be presented on a remote device such as a tablet computer or mobile device, as shown in FIG. 14. The tablet computer and mobile device can inter-operate with the apparatus 100 through the interface 1370 using a wireless gateway.

Method—Overview.

Figure 19:
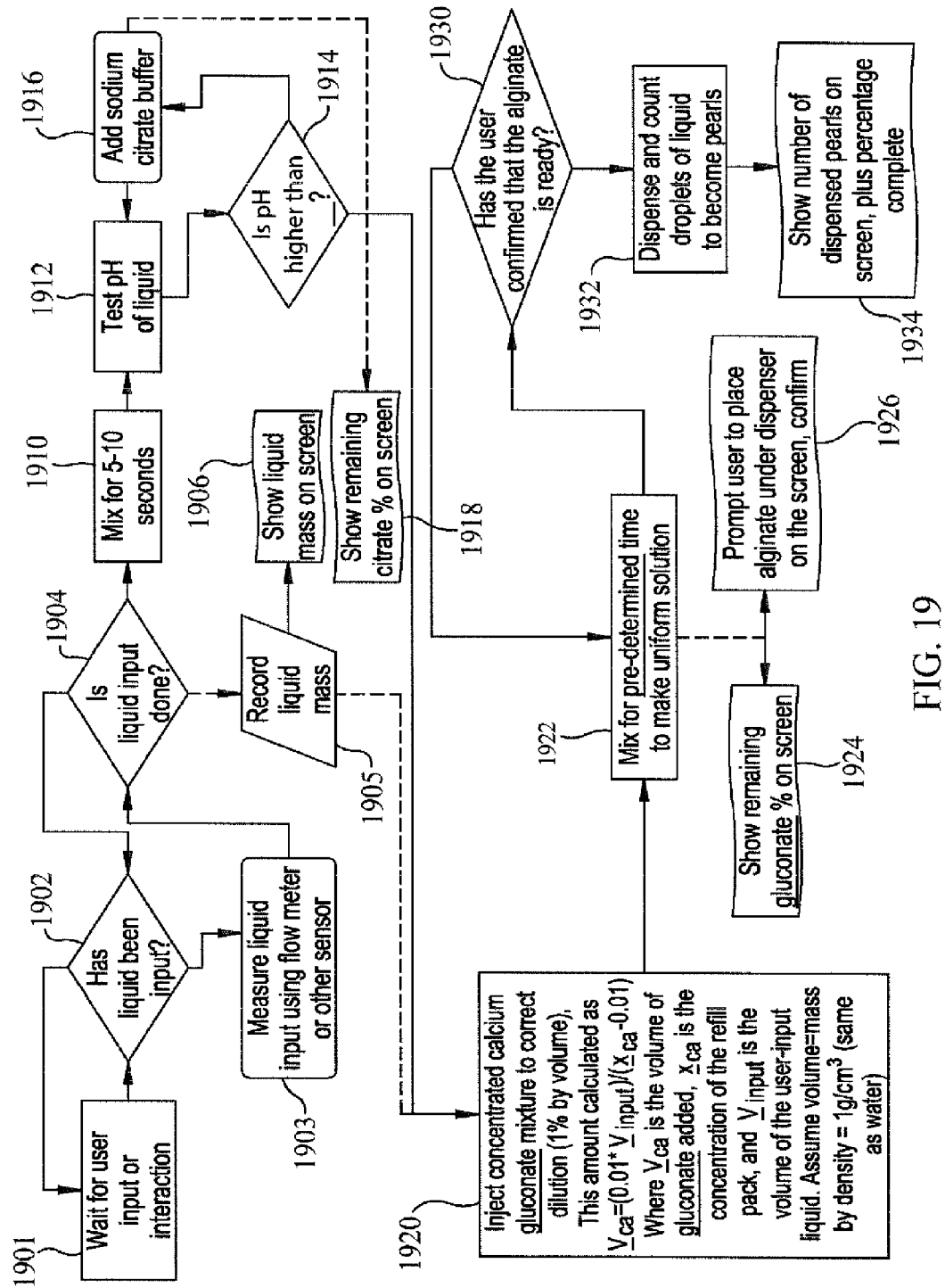
FIG. 19 shows a flowchart of a method according to an embodiment of the present invention.

Referring now to FIG. 19, there is shown a flowchart of a method for formulating pearls, according to one embodiment of the present invention. We wait for user input or interaction in step 1901. The method begins with liquid input (substrate) poured into the mixing tank 210. Once we determine that the liquid has been poured in step 1902, in step 1903 the apparatus measures the liquid input, perhaps by using a flow meter, sensor, or a calibrated container. Once the liquid is input as determined in step 1904, the liquid volume is recorded in step 1905 and shown on a display in optional step 1906 (the display is an optional attachment/upgrade).

In step 1910 the liquid input is mixed in the mixing tank 150 for a predetermined amount of time. In step 1912 the pH level of the substrate can be tested, perhaps by an internal pH sensor. If the pH is higher than a pre-determined threshold amount as determined in step 1914, we add a carefully calibrated proportional amount of a buffering agent such as sodium citrate as needed to achieve the desired pH level in step 1916. The ratio of the pH buffer to the mix is programmed. The amount of buffering solution remaining can be displayed in step 1918.

For reverse spherification, once we have achieved an optimal pH level, in step 1920 a gelling agent such as a Calcium salt (concentrated calcium gluconate solution) is injected to the correct dilution. This dilution amount is preprogrammed into the apparatus 100 and calculated as: $VCa=(0.01*Vinput)/(xCa-0.01)$ where $VCa$ is the volume of gluconate added, $xCa$ is the concentration of the refill pack and $Vinput$ is the volume of the user-input liquid. Assume volume=mass by density~=1 g/cm$^3$ (same as water). For regular spherification, we add a gelling agent such as, but not limited to, sodium alginate.

We mix this for a pre-determined time to make a uniform solution in step 1922. We can display the percentage amount remaining of the gluconate (or alginate) on the display in step 1924 and prompt the preparer to place alginate under the dispenser in step 1926, if required. In some embodiments, this process is automated and the alginate is injected into a ready container. Once it is confirmed that the alginate dispenser is ready in step 1930 (either by human input or sensor feedback) the apparatus 100 dispenses and optionally counts the droplets of liquid to become pearls 180 in step 1932. For reverse spherification, the droplets are dispenses into a bath of a gelling agent such as sodium alginate. The regular spherification, the bath is a salt solution. The apparatus 100 can also display the number of dispensed pearls on the display, plus the percentage complete in step 1934.

Method—Pearl Formation.

Figure 15:
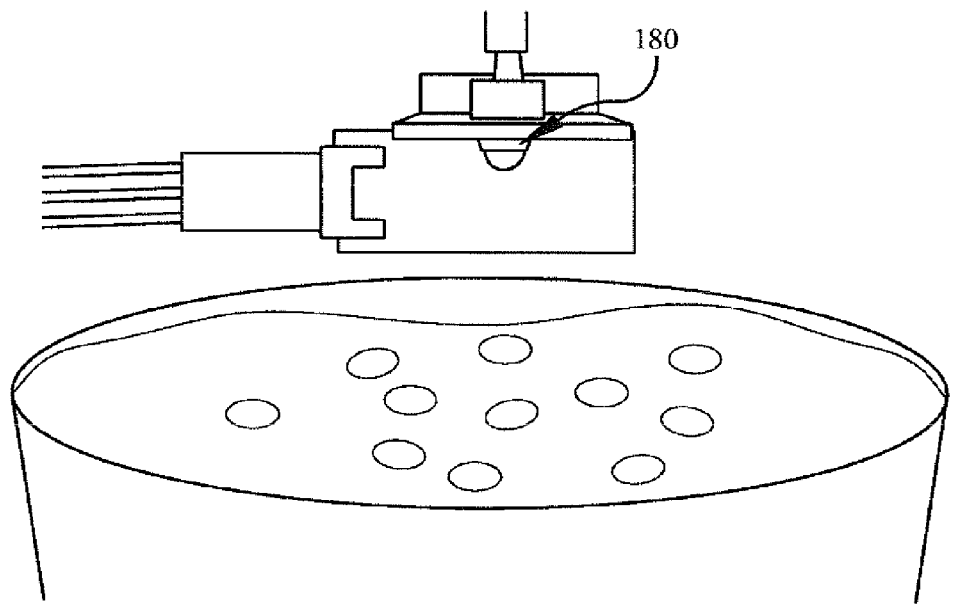
FIGS. 15, 16, 17 show close-up views of the pearl formation, according to an embodiment of the present invention.
Figure 16:
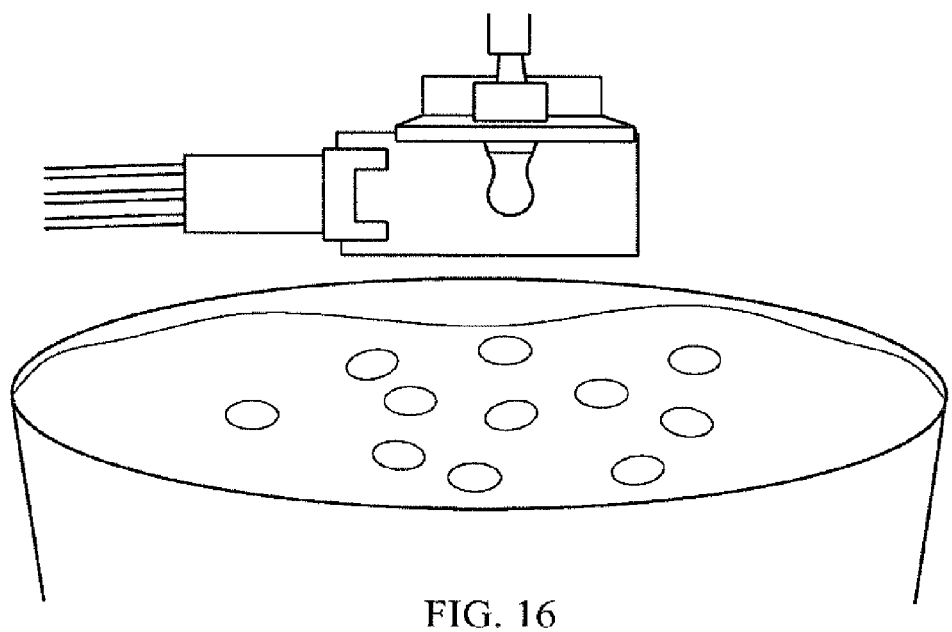
Figure 17:
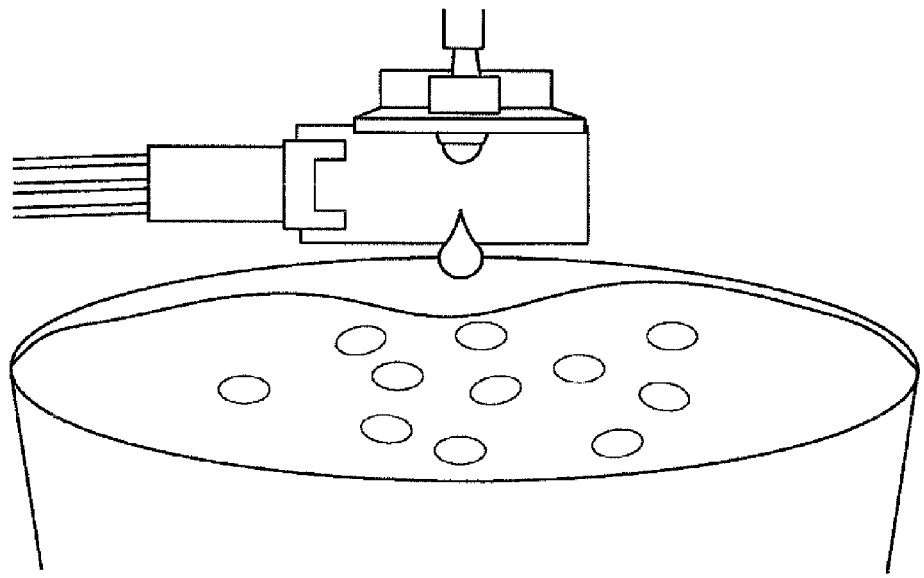

FIGS. 15 through 17 show a close-up view of the dispensing and formation of a pearl 180. FIG. 15 shows a close-up view as a droplet starts to emerge from the machine 100. FIG. 16 shows another close-up view of the droplet as it enlarges. It is now about to fall into the bath 150. FIG. 17 shows another close-up view after the droplet has fallen into the bath 150. You will note that another droplet is immediately forming. The color of the pearls 180 can be customized, as can the size of the pearls, which is determined by the width of the tubing or the nozzle.

Method—User Interaction

In another embodiment of the present invention, the user can provide his/her own recipe. Users can save and store their drink preferences either locally or remotely in a social media or cloud-linked system. We envision that a user can walk into any bar anywhere in the world and order "the usual." Users are able to share their favorite "pearl recipes" and form social groups based on drink preferences. Referring to the drawing in FIG. 14, the interface 1370 provides a Submit button 1430 and a Share button 1425. When the user activates the Share button 1425, the user-customized recipe will be shared with the contacts within the user's social network (from Facebook, Twitter, Yahoo! Social, and the like). Expanding on this, we open the gateway to highly targeted ads from beverage companies based on very accurate user drink statistics. Cloud computing security can be used to safeguard the identities of the users. With Cloud computing we are also able to map the usage of the product and gauge client satisfaction and demographic attributes for strategic planning and marketing.

Method—Recipes.

There are a myriad of recipes for both food and beverages that can be made with the apparatus 100. Some examples are: spirits, alcoholic and non-alcoholic cocktails, soy sauce and other sauces or condiments dissolved in a liquid, vinegars, oils such as olive oil, lime juice, syrups, cocktail mixers, carbonated beverages, puddings, desserts, fruit drinks, still and sparkling water, to name a few. Additionally, medicines, especially medication for children, can be made into pearls 180 to make the medicine appear more palatable to a child. It is known that a pH of above 5 is best for gelling liquids of all types. Sodium Alginate is commonly added as 0.8% by weight, while calcium chloride is commonly added as about 0.5% by weight. Optimized concentrations for the refill packs will have to be determined in order to minimize cost, maximize throughput, and maximize output.

Method—Metrics, Analytics.

As previously mentioned, the apparatus 100 according to embodiments of the invention, even in its most basic form, contains a "brain" (microprocessor) and sensors, allowing for monitoring and gathering a myriad of useful metrics. With these metrics we are able to monitor the status of the apparatus and the refill packs remotely, as well as generate "health report cards." We can monitor levels of refill packs, which refill packs are being used the most, how often each pack is used, and what flavors are more popular in certain regions.

We can send out reminders to order new refill packs and keep track of customers on a server where the apparatus is the client in a client-server paradigm. We can also keep track of customer's favorite recipes and recommend similar concoctions to try. We can perform remote troubleshooting and maintenance.

Hardware Embodiment.

Figure 20:
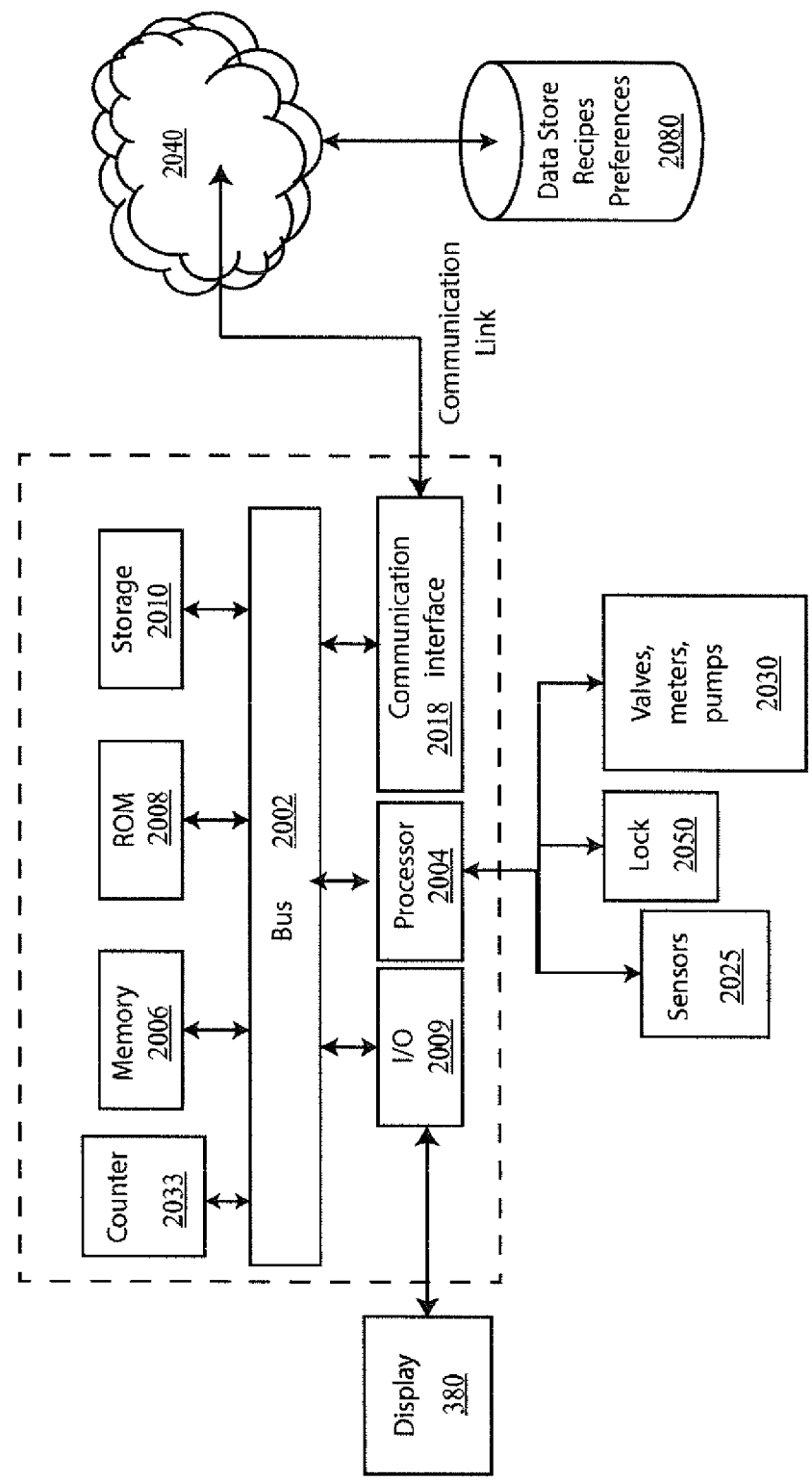
FIG. 20 shows a simplified block diagram of a computer device configured to operate according to an embodiment of the present invention.

Referring now to FIG. 20 there is shown a simplified block diagram of a computing device 2000 configured to operate according to an embodiment of the present invention. The device 2000 includes components normally found in computing devices: at least one processor device 2004, memory 2006, bus 2002, storage 2010, an input/output subsystem 2040, and an optional communication interface 2018 for access to the Internet, Cloud computing 2040, or other communication devices. The I/O subsystem 2040 is operably coupled with the screen 320. Preparers can interact with the device via their own computing devices through the Internet or a mobile app gateway. A data store 2080 is in operative communication with the device. The data store 2080 can hold recipes, user information such as drink preferences, and other data.

At least one sensor 2025 is operably coupled with the processor device 2004. The sensor 2024 can be inter alia, a pH level indicator, an ethanol sensor, a flow sensor, a light sensor, and others. An optional counter 2033 is incremented when the drops are released. Block 2030 represents the valves, meters, and pumps that may be required to operate the device 2000 in the formulation of gelled pearls. The arrowed lines represent either wired or wireless links between and among the internal components and the external components, attachments and the like. For example, rather than the conventional wiring, we contemplate an embodiment with signals controlling the flow valves, meters, and pumps, negating the use of wires within the machine 2000. An optional locking mechanism 2050 such as an electromagnetic locking mechanism can be used to safeguard the liquids.

Therefore, while there has been described what is presently considered to be the preferred embodiment, it will understood by those skilled in the art that other modifications can be made within the spirit of the invention. The above descriptions of embodiments are not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiments described above.

We claim:

1. An apparatus for producing gelled pearls, comprising:
   a housing comprising at least one aperture into which a flavored liquid is provided;
   a first ingress port through which a first solution is provided;
   a second ingress port through which an edible pH buffer solution is provided;
   a mixing tank coupled with the at least one aperture, the first ingress port, and the second ingress port;
   a mixing mechanism in the mixing tank;
   a dispenser comprising tubing coupled to the mixing tank, the dispenser expelling a processed solution from the mixing tank in a form of droplets into a gelling bath; a third ingress port through which a cleansing agent is provided; and a microcontroller; the microcontroller: is configured to:
dispense a volume of the flavored liquid through the at least one aperture into the mixing tank;
determine if a pH level of the flavored liquid is within a predetermined threshold and if the pH level is not within the predetermined threshold, dispensing an amount of an edible pH buffer solution through the second ingress port into the mixing tank to get the pH level within the predetermined threshold configured to provide a predetermined level of pH suitable for gelling process;
calculate an amount of the first solution to add to the mixing tank based on a volume of the flavored liquid;
dispense the calculated amount of the first solution into the mixing tank;
activate a mixing mechanism to make a processed solution in the mixing tank; and
activate the dispenser to dispense the processed solution as droplets into a gelling bath to gellify the droplets into gelled pearls; and direct the cleansing agent into said gelling bath; wherein the dispenser include a nozzle; and a diameter of the tubing and the nozzle affects a size of the gelled pearls, such that wider tubing and a wider nozzle generate larger gelled pearls.

2. The apparatus of claim 1 wherein the apparatus performs spherification and wherein the first solution comprises concentrated sodium alginate.

3. The apparatus of claim 1 wherein the apparatus performs reverse spherification and wherein the first solution comprises a salt solution.

4. The apparatus of claim 1 wherein said mixing mechanism comprises a stirring mechanism.

5. The apparatus of claim 1 further comprising: an optical drop counter counting the droplets as the droplets are dispensed into the gelling bath.

6. The apparatus of claim 5 further comprising: a one-way flow nozzle attached to a refill pack for securely inserting the refill pack into at least one of the first or second ingress ports.

7. The apparatus of claim 6 further comprising: a digital identification reader validating an identifier disposed on the refill pack.

8. The apparatus of claim 1 further comprising: a communication link providing remote capability in operating the microcontroller.

9. The apparatus of claim 1 further comprising: a display window providing information about production of the gelled pearls.

10. The apparatus of claim 9 further comprising: a user interface comprising user-selectable options selected for customizing the gelled pearls.

11. The apparatus of claim 10 wherein the user interface is generated on a remote device.

12. The apparatus of claim 11 wherein the user-selectable options comprise recipes and wherein the microcontroller device further performs:
receiving a recipe; and
calculating amounts of fluids to combine in order to follow the recipe.

13. The apparatus of claim 3 wherein the salt solution comprises calcium lactate gluconate.

14. The apparatus of claim 13 wherein the gelling bath comprises sodium alginate.

15. The apparatus of claim 2 wherein the gelling bath comprises a salt solution.

16. The apparatus of claim 15 wherein the salt solution comprises calcium lactate gluconate.

17. The apparatus of claim 1 wherein the buffer solution comprises sodium citrate.

* * * * *